April 6, 1965 CHAO KONG CHOW 3,177,469

CHARACTER RECOGNITION

Filed Aug. 31, 1959 17 Sheets-Sheet 1

INVENTOR.
CHAO KONG CHOW
BY William E. Cleaver
AGENT

INVENTOR.
CHAO KONG CHOW
BY
William E. Cleaver
AGENT

*INVENTOR.*
CHAO KONG CHOW
*BY*
William E. Cleaver
AGENT

INVENTOR.
CHAO KONG CHOW
BY William E. Cleaver
AGENT

INVENTOR.
CHAO KONG CHOW
BY William E. Cleaver
AGENT

INVENTOR.
CHAO KONG CHOW
BY William E. Cleaver
AGENT

*INVENTOR.*
CHAO KONG CHOW
*BY* William E. Cleaver
AGENT

INVENTOR.
CHAO KONG CHOW
BY
William E. Cleaver
AGENT

INVENTOR.
CHAO KONG CHOW
BY William E. Gleaver
AGENT

INVENTOR.
CHAO KONG CHOW
BY William E. Cleaver
AGENT

*INVENTOR.*
CHAO KONG CHOW
*BY*
William E. Cleaver
AGENT

INVENTOR.
CHAO KONG CHOW
BY
William E. Cleaver
AGENT

INVENTOR.
CHAO KONG CHOW
BY
William E. Cleaver
AGENT

INVENTOR.
CHAO KONG CHOW
BY William E. Cleaver
AGENT

INVENTOR.
CHAO KONG CHOW
BY
William E. Cleaver
AGENT

INVENTOR.
CHAO KONG CHOW
BY William E. Cleaver
AGENT

INVENTOR.
CHAO KONG CHOW

BY
William E. Cleaver
AGENT 3,177,469

CHARACTER RECOGNITION

Chao Kong Chow, Bryn Mawr, Pa., assignor to Burroughs Corporation, Detroit, Mich., a corporation of Michigan Filed Aug. 31, 1959, Ser. No. 837,099
22 Claims. (Cl. 340—146.3)

This invention relates to data processing techniques and in particular to character recognition systems.

Generally in data processing techniques the information to be processed is fed into a data processing system by way of intermediate means. For example, printed or written information is transferred from an original source into punched cards, or into punched tape, or to magnetic tape, etc., and from these various intermediate means the information is read into the system. The elimination of the intermediate means is, of course, a desirable goal and has become a reality with the introduction of character recognition techniques. In the art of character recognition, the printed or written information is read from the original documents directly into the data processor.

There are at least two main classifications of character recognition systems. One main classification comprises optical techniques where the printed material is read by means of a reading station which distinguishes between inked areas and non-inked areas (or between different shades of ink) based on the optical properties. Very often standard television techniques are employed in such operations. The other main classification comprises a system wherein the characters are initially printed with magnetizable ink. The inked characters are then magnetized at a magnetizing station and subsequently read by a magnetic read head at a reading station.

Each of these two main classified systems has advantages over the other. First, the optical system does not require that the characters be printed with special ink (magnetizable ink) because the optical system is only concerned with recognizing relatively black and white areas on the original document. On the other hand, in the magnetized ink system the reliability of the information obtained at the reading head is not diminished by dirty marks by overprinting with non-magnetic ink, by overlays such as cellophane tape, etc. on the original document, as is the case in the optical system.

The American Bankers Association has adopted the use of magnet ink characters in systems providing for automatic processing of checks. In accordance with work done in this direction, there has been developed a set of extraordinarily or irregularly formed numeric characters which differ substantially from the popular type fonts, such as Gothic, etc. The development of these irregularly formed characters appeared necessary, because, with a single magnetic reading head great difficulty is encountered in distinguishing between certain numbers. For instance, if the numeral "8" and the numeral "0" are both printed with Gothic type font (and magnetized ink), the change of flux resulting when the document is passed under a single magnetic reading head, is so nearly the same that the system experiences great difficulty in distinguishing between these numerals. The same problem arises in connection with the printed numerals "2" and "5." Hence, the development of the magnetic ink system has led to the design of irregular formed characters. In brief, it can be said that in any magnetic ink character recognition system, if a single magnetic read head be used, there will not be enough information provided by popular type fonts to enable the system to distinguish adequately between various characters, and therefore this deficiency requires a collateral change in design of the type font.

It seems clears that if such a magnetic ink character recognition system is extended to alpha-numeric characters, many of the alphabetic characters will have to be reshaped or reformed in order for the system to provide distinct and characteristics signals. But an all-inclusive reshaping of alpha-numeric characters would introduce undesirable aspects into a character recognition system. For instance, there would be lack of each readability of an original document by a human reader.

Another basic problem included in both of the main classifications of character recognition systems, referred to above, is the need of registration of a document with respect to the reading head. Since, fundamentally, a character being read from an original document is compared against a standard reference character or reference characteristics stored in the system, the signal produced by the read head must resemble the stored reference signal, otherwise a proper match cannot be obtained. If a character on an original document passing under the read head is not vertically aligned therewith, or if there is skewing of the document, the signal produced by the read head will not be properly matched with the signals of the stored reference characters and will not be readily identified.

A more desirable character recognition system would be free from registration problems, and would provide enough information from a printed or written character to enable the system to recognize the character without requiring that the shape of the character be other than normally formed.

It is therefore an object of the present invention to provide an improved character recognition system which is operable with either an optical or a magnetic reading station.

It is another object of the present invention to provide a character recognition system which so deals with information obtained from the characters being read, in accordance with the features of the respective characters, that sufficient information can be obtained from any character irrespective of its font to enable the character to be recognized.

It is a further object of the present invention to provide a character recognition system which will be relatively free of registration limitations.

In accordance with the present invention there is provided a sufficient number of information channels to recognize the features of a character, (which features can be sensed or detected by the presence or absence of the printed or written lines of the character) whereby such feature information may be processed to identify the character being read.

In accordance further with the present invention there are provided parallel reading channels coupled to parallel reading positions, or heads, so that irrespective of the vertical location of the character being read, a sufficient number of reading heads, or stations, will cover the character.

In accordance further with the present invention there is provided circuitry means to process the character feature information read to recognize a reference feature, for instance the top of the character, and to align all other character feature information with this reference feature to subsequently provide the character recognition.

In further accordance with the present invention the total bits of character feature information are reduced to the minimum of useful, reliable bits of feature information necessary to distinguish each of the characters which the system is required to recognize, and by such reduction to reduce the amount of circuitry necessary to perform the desired recognition.

The foregoing and other objects and features of this invention will be best understood by reference to the following description of the invention taken in conjunction with the accompanying drawings, wherein.

Figures 2, 16:
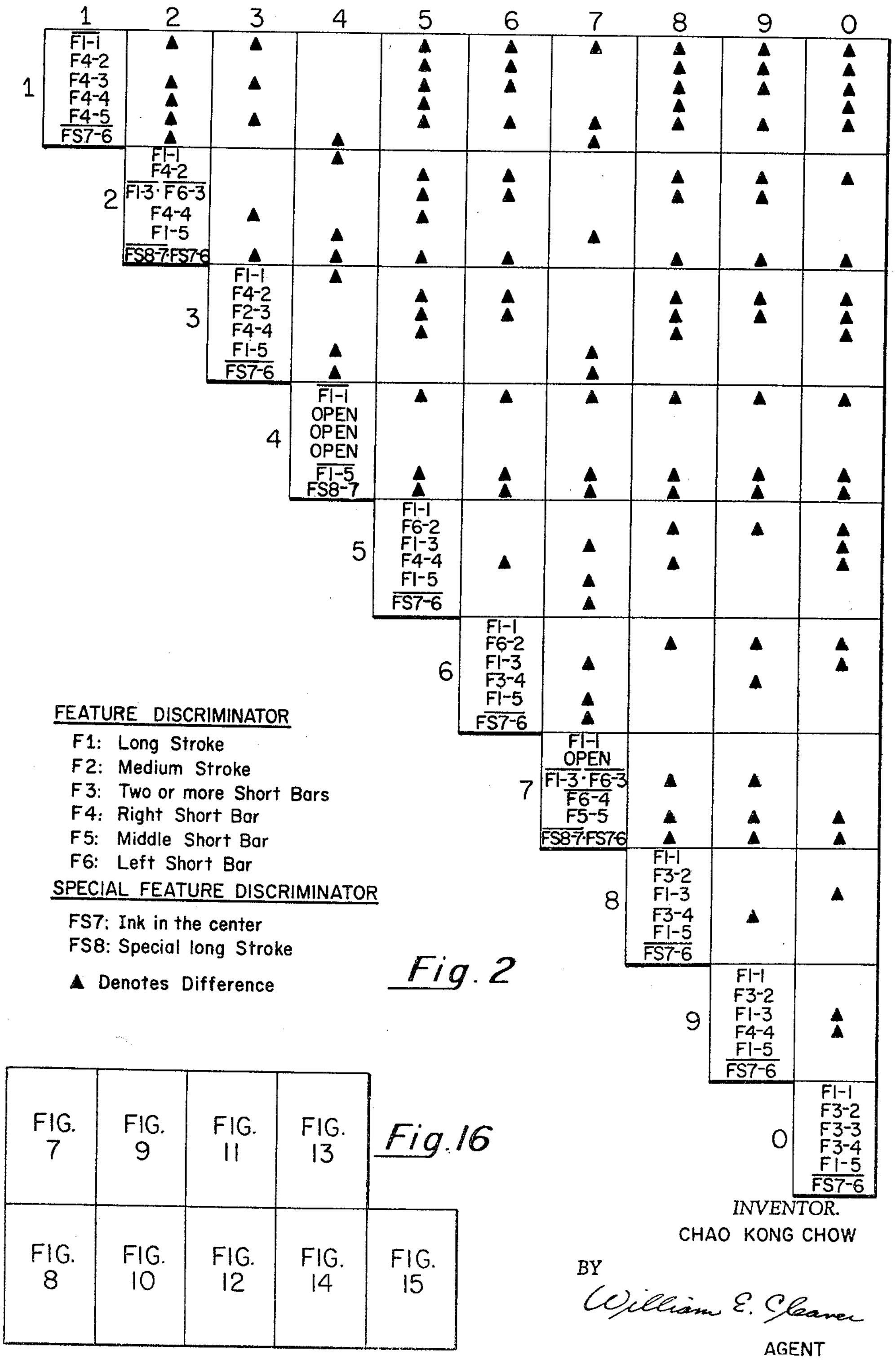
FIG. 2 is a chart for comparing and determining useful, reliable features of the characters.
Figure 4A:
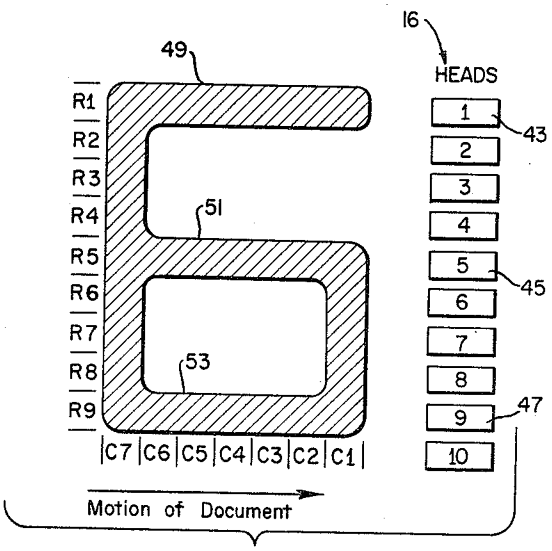
Figure 6:
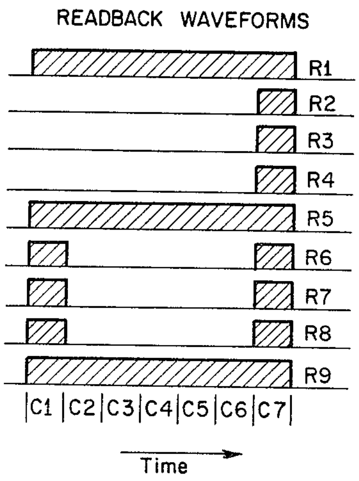
Figure 4B:
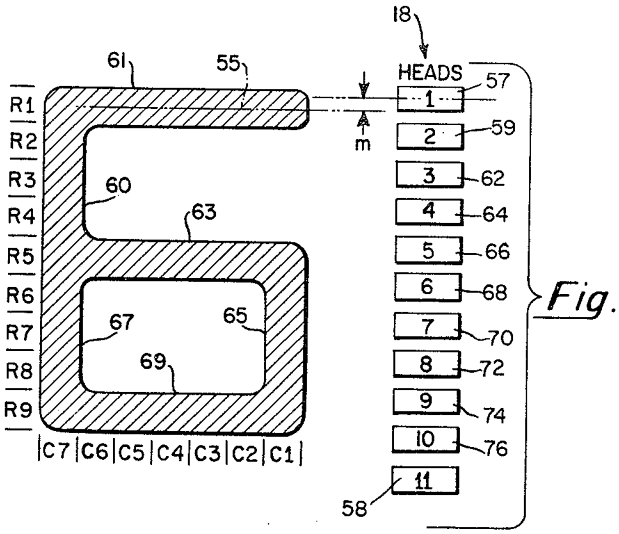
Figure 5A:
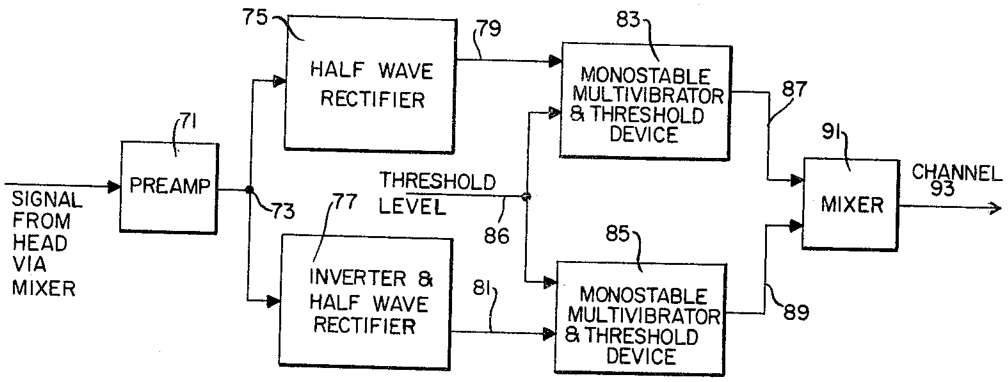
Figure 5B:
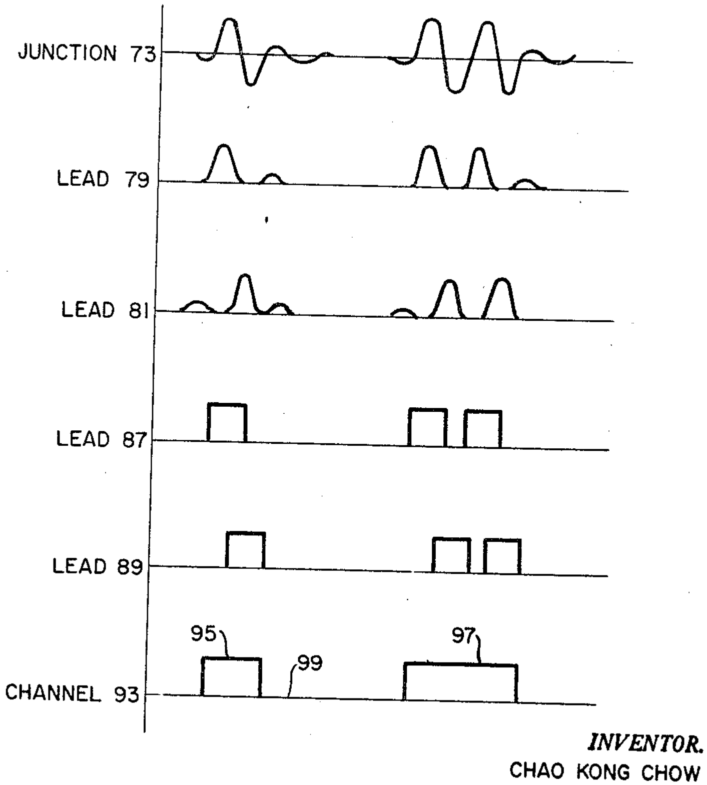
Figure 17:
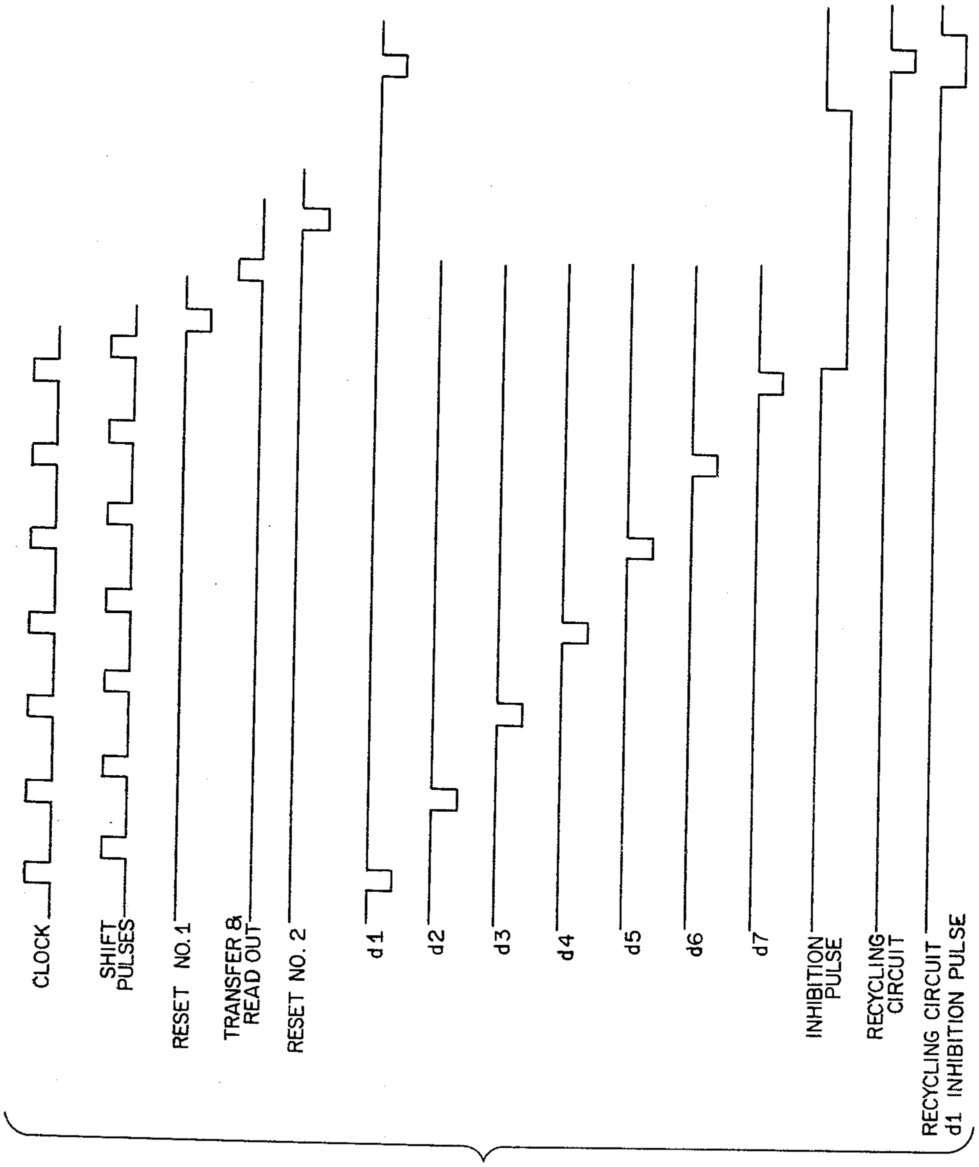
Figure 18A:
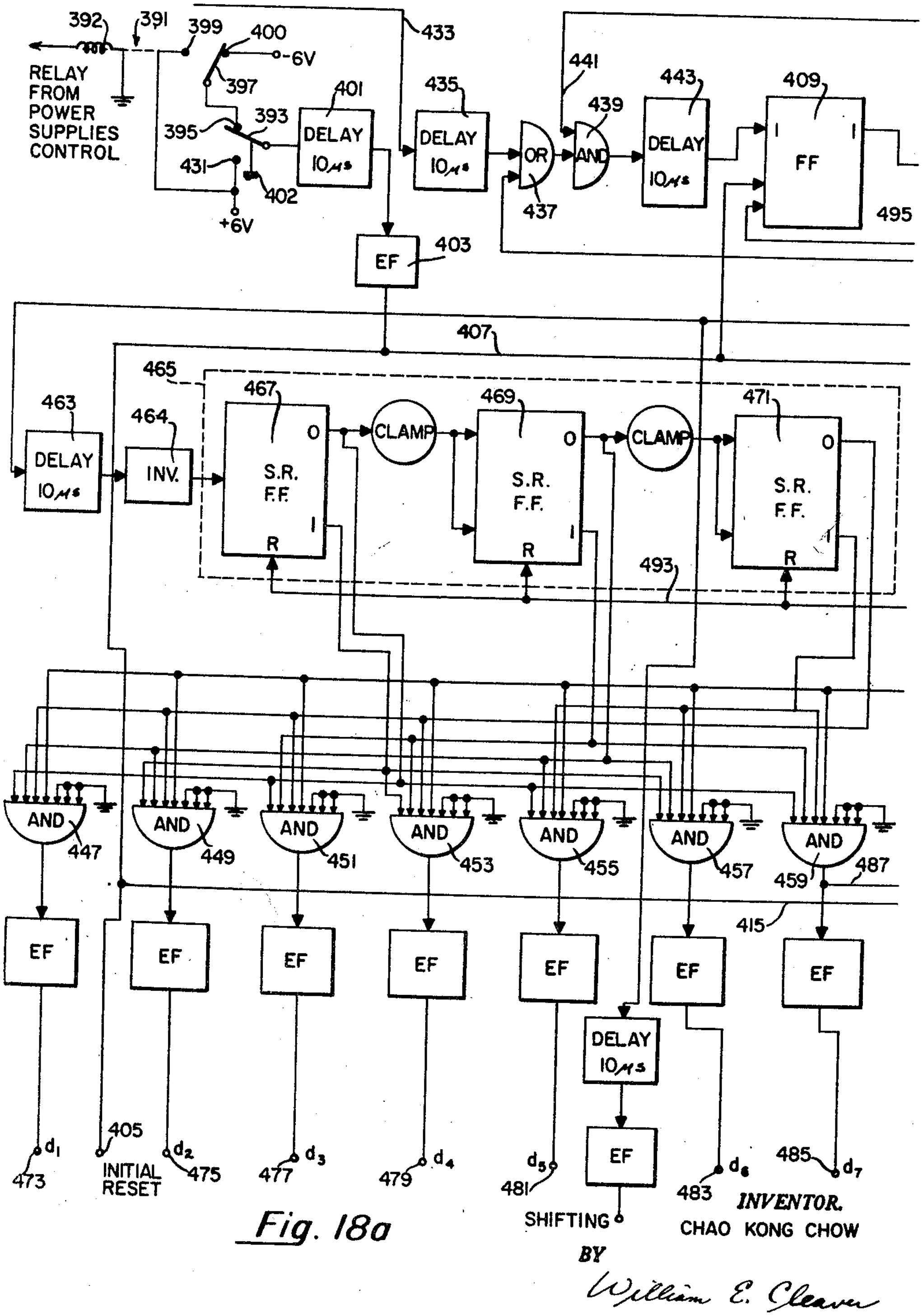
Figures 18B, 18C:
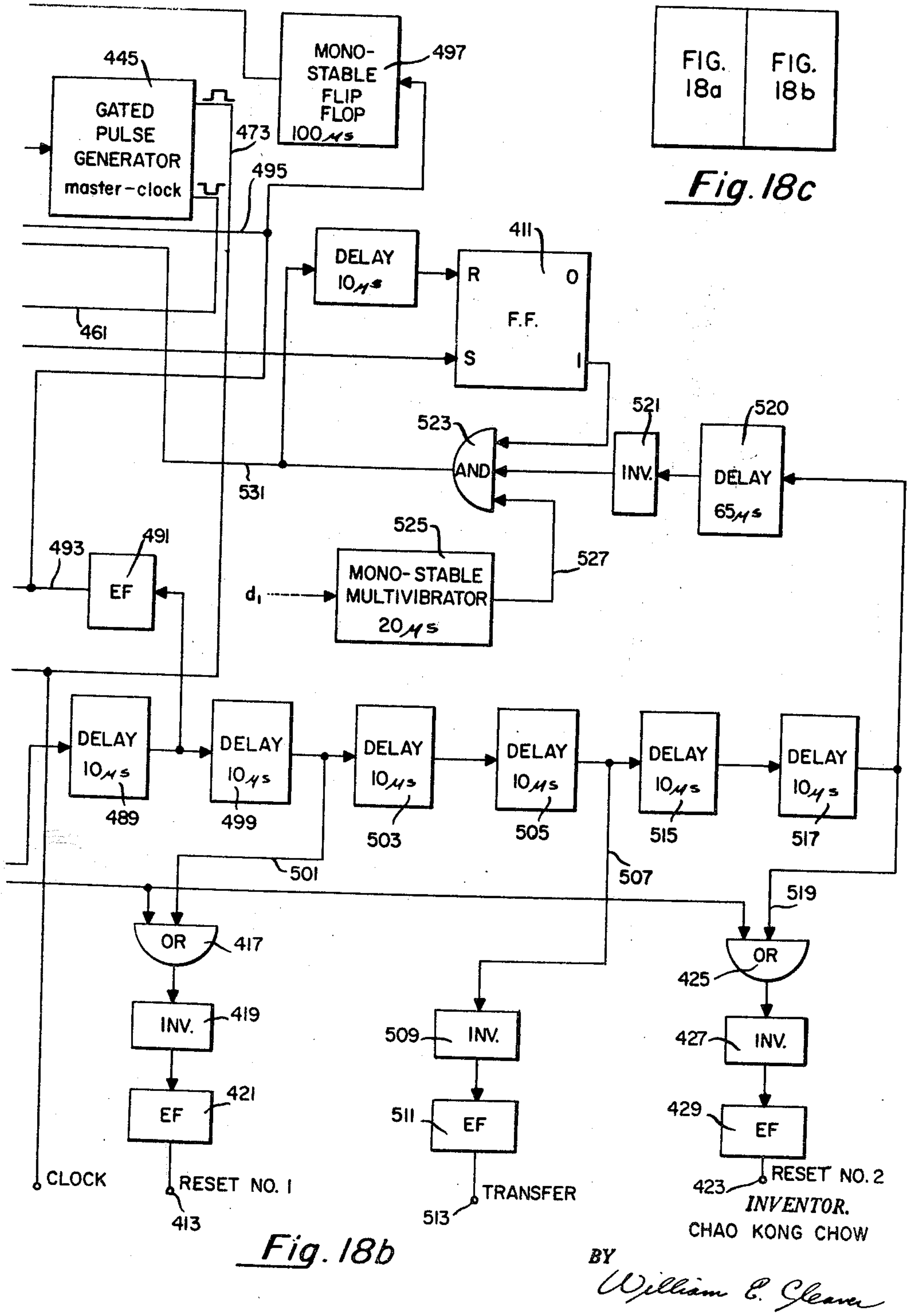
Figure 20:
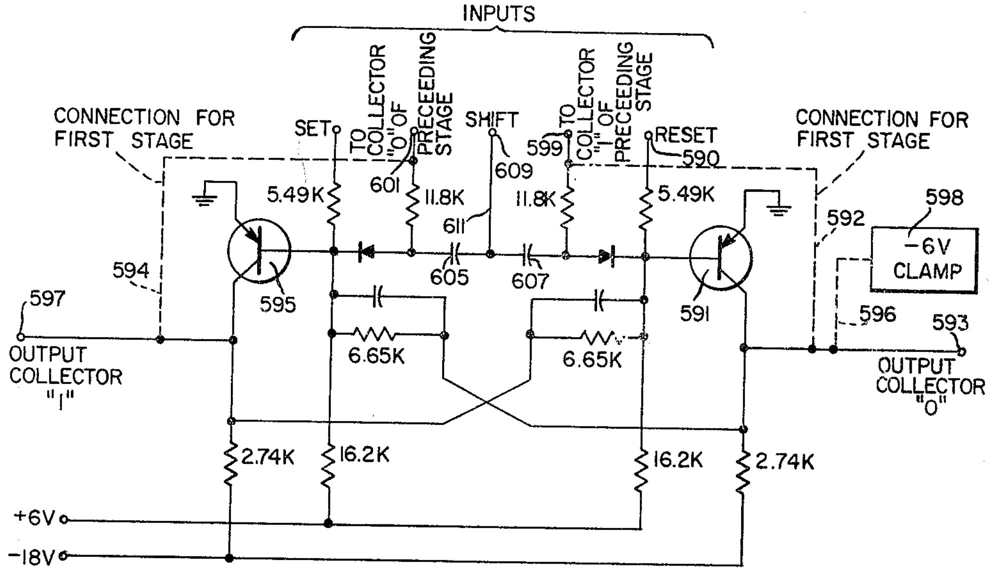
Figure 19:
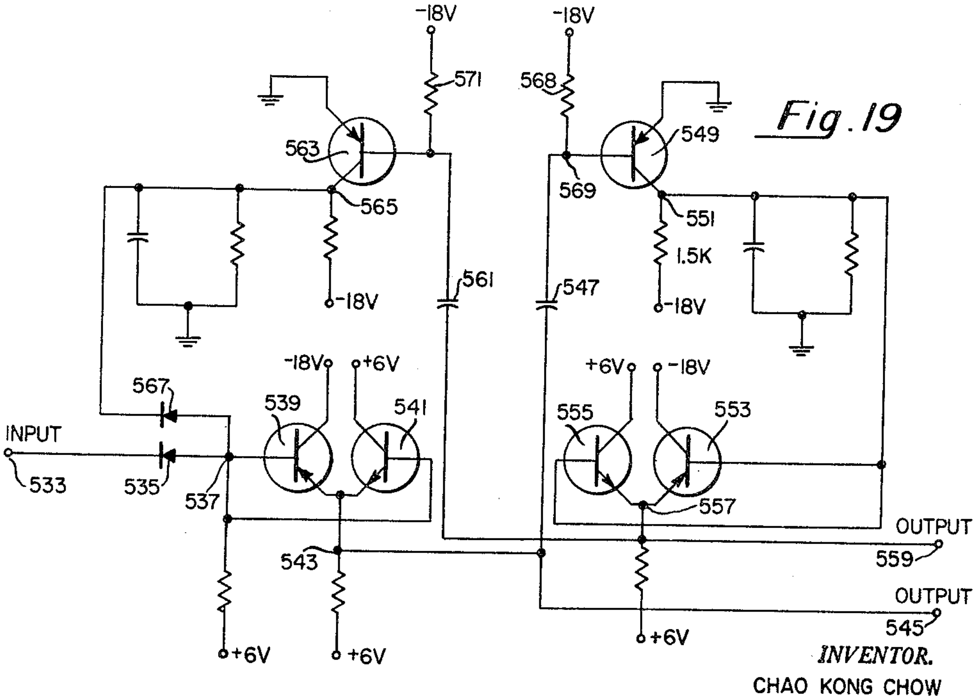

FIGS. 4*a* and 4*b* are two drawings showing a numeral aligned in two possible positions with respect to the reading heads;

FIGS. 5*a* and 5*b* are respectively a block diagram of the preamplifier-digitizer circuit and significant waveforms therefor;

FIG. 6 shows the digitized signals for the numeral of FIG. 4*a*;

FIGS. 7 through 15 make up together a schematic block diagram, in detail, of the overall system;

FIG. 16 is a layout for FIG. 7 through FIG. 15;

FIG. 17 shows the waveforms for the timing circuit;

FIGS. 18*a* and 18*b* are schematic-block diagrams of the timing circuit;

FIG. 18*c* is a layout for FIGS. 18*a* and 18*b*;

FIG. 19 is a schematic of a typical pulse generator;

FIG. 20 is a schematic of a typical bistable multivibrator (flip-flop) used in the shift register of the preferred embodiment.

A printed or written character can be determined or recognized by a unique combination of features. In a character recognition system which functions on the principle of detecting the features of each of the characters, the signals which are produced at the system's read station may be referred to as feature signals. The feature signals generated by a character being read must be eventually combined to determine whether their combination forms the unique combination of any one of the particular characters which the system is required to recognize. In a multiple-scan, or spot scan, system, it is logical to consider intentionally marked spots, or points, as elementary features of a character. The permissible size of the spots is determined by the combined resolution of the scanning device and the registration section of the system. So far as the recognition logic is concerned, there are two mutually exclusive and totally exhaustive outcomes associated with each spot, namely there is ink or there is no ink. Due to printing variations on documents and inherent noise in electrical devices, if the outcome signal were dependent upon elementary spots, or points, this outcome signal would not be very reliable. Therefore, in view of this relatively low reliability of the outcome signal from single points, it is not desirable to consider points as rigidly defining features of characters. Instead, character features should be considered as aggregate point outcomes.

Assume that the physical area within which the size of a character is limited or may be printed is divided into "*i*" rows and "*j*" columns. Let $X_{ij}$ denote any point at the "*i*" row and the "*j*" column of the above-defined character grid. In a preferred embodiment, there are nine rows and seven columns. Since, according to the above assumption, each of the characters which can be recognized must be limited in size to fit into the grid of the "*i*" rows and "*j*" columns, it follows that each feature $F_i$ of each character can be defined by means of a set $S_i$ of points $X_{ij}$. For instance, consider a character having a feature $F_1$, which in fact is a long horizontal stroke at the top of the character. This stroke, feature $F_1$, can be defined as having at least five out of seven points $(X_{11}, X_{12} \ldots X_{17})$, black. The first subscript letter (or number) in these last notations represents the row and the second subscript represents the column. The presence of a feature $F_i$ is determined when a set $S_i$ of points $X_{ij}$, defining the feature, is detected.

A feature $F_i$ is said to be "useful" in distinguishing between characters, or determining characters, such as $A_j$ and $A_k$, if the relationship exists that $A_j$ has the feature $F_i$ and $A_k$ does not have the feature $F_i$. If in any character recognition process, the "useful" feature $F_i$ is found to be present there is an implication that the character in question is not $A_k$ and that it may be $A_j$. It also follows from the definition that if $F_i$ is a "useful" feature, its negation $\overline{F}_i$ is also a "useful" feature. It should be understood that the absence of $F_i$ means the presence of $\overline{F}_i$, and vice versa.

$F_i$ can also be defined as a "reliable" feature of the character $A_j$ if the conditional probability of occurrence is high when the character being recognized, or read, is in fact $A_j$. It follows then that $F_i$ becomes a useful reliable feature if (1) it is capable of making it possible to distinguish $A_j$ from $A_k$, and (2) the probability of its occurrence is high when indeed $A_j$ is present. Although a reliable, but not useful, feature is not capable, by definition, of distinguishing characters, yet it may be used to separate characters from pure noise and to facilitate rejection in the case of an over-deteriorated character.

A set of features is considered sufficient if the set can uniquely define all of the alpha-numeric characters in an alpha-numeric system, or all of the numerical characters in a system limited to a recognition of numerical characters. In other words, if every character is uniquely defined or identified by a combination of features belonging to the set, then the set is considered sufficient. A recognition logic can be attained when a sufficient set of features is specified.

The following is at least one philosophical approach in determining what is a sufficient set of features, although there are other approaches which are more exhaustive. Consider an alphabet of two characters, $A_1$ and $A_2$. In the simplest form there are two features used to identify these two characters, $F_c$ and $F_d$. $F_c$ is common to both characters, while $F_d$ is not. A decision rule can be then written which is as follows:

$$(A_1)\Delta_1 = F_c.F_d$$

$$(A_2)\Delta_2 = F_c.\overline{F}_d$$

$$(\text{Reject})\Delta_r = \overline{\Delta}_1.\overline{\Delta}_2 = \overline{F}_c$$

Where the dot (.) notation means logical "and," the bar ($\overline{\ \ }$) notation means logical "not," and Δ means the outcome to detect its subscript. Provision for a reject is necessary because in the event that the character is some symbol other than those which are to be recognized, the document carrying such a symbol should be set aside to be specially handled.

It is generally true that both $F_c$ and $F_d$ have similar degrees of vulnerability to noise, that is to say, for increasing noise both features become less reliable. The absence of $F_c$ can be used to provide some kind of indication of noise severity, and to convert a potential misrecognition into a reject.

In accordance with a preferred embodiment of the invention, circuits are provided and the feature identification selectively determined to nullify, or mitigate, the effect of noise in the operation. In the pre-amplifier circuits signals having frequencies outside a certain bandwidth are filtered out. In the digitizer circuits signals whose amplitudes are below a certain level are noneffective. Both of these last-mentioned circuits help control the effect of noise. In addition the features are identified by selected numbers of points which selection provides that the system gives the most desirable performance relative to maximum reliability of identification and minimum false rejection. By way of example, a long stroke in the present system is recognized by the detection of ink in five or more out of seven grid positions along a grid row. If the printing were light or nil in the third or fifth positions (or any two other positions) but good in the remaining five positions, the system would nevertheless correctly identify the printed line as a long stroke. On the other hand if four postions were "inked in" along a grid row, in an overprint of a medium stroke, such a feature would not be recognized as a long stroke but would be recognized as a medium stroke. Relying on engineering experience relative to noise effect, the identification of each feature has been set up to provide a reliable system that can operate with printed characters which generate a high noise level.

This earlier suggested qualitative reasoning can be extended to an alphabet of more than two characters. It may be concluded that finding a sufficient set of features provides the basis for obtaining a recognition logic. The set should include "reliable" features as well as "reliable," "useful" features. The goal is, of course, ultimate reliability and simplicity for the system. As a guide in a simple numerical system, the following criteria are suggested:

(*a*) The set of features must be sufficient and must consist of both reliable features and reliable, useful features;

(*b*) Points in defining a feature should be neighboring;

(*c*) The number of points in each feature should be relatively large;

(*d*) The number of features in the set should not be large.

The following comments should be noted relative to the above-listed criteria: (*a*) assures the recognition of each and every character in the "alphabet" for which the system is responsible; (*b*) and (*c*) tend to enhance the reliability of the features, while use should be made of any known property of the noise and signal structure; (*d*) should not be over-emphasized.

Any additional feature which would appreciably increase the over-all reliability should, of course, be incorporated. A minimal set obtained at the expense of reliability obviously would not be desirable. Furthermore, in actual practice the judicious addition of a few features would probably not materially increase the cost of the system.

In view of the above philosophy, a sufficient set of features is suggested and used in the preferred embodiment of the present invention. The features are designated as follows:

*F*1=long stroke
*F*2=medium stroke
*F*3=two or more short bars
*F*4=a short bar at the right
*F*5=a short bar at the center
*F*6=a short bar at the left
*FS*7=ink in the center
*FS*8=special long stroke where the strokes are considered running along horizontal paths and the bars are considered running along vertical paths. It should be noted that the first six features are not specifically associated with a vertical level of the character. In other words, the feature F1, or long stroke, may appear at the top of a character (F1–1) or near the middle of the character (F1–3) or at the bottom of the character (F1–5) or elsewhere. The term "vertical level," used through the specification and in the claims, will be understood to mean a horizontal section of the grid measured vertically from the bottom row line of the grid.

Figure 3:
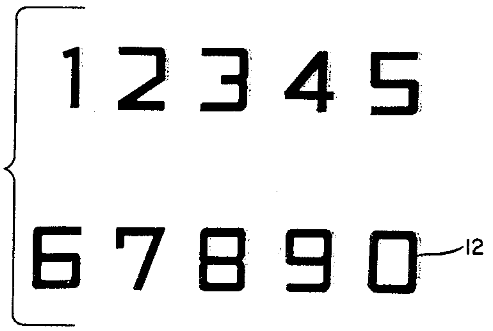
FIG. 3 shows the characters to be recognized by a preferred embodiment of the invention.

An examination of the suggested features to determine whether or not they represent a "sufficient set" may be made by the construction of a chart as shown in FIG. 2. At the left of the rows and at the top of the columns are shown the numerals which are to be recognized. The eight features mentioned above are listed below and to the left of the chart. In the chart, two identification numbers are associated with each F. The first of the F identification numbers, for example, the number 4 of F4–2, indicates the particular feature as defined in the table given above. The particular features included in the particular blocks of said chart may be chosen either by a "cut and try" method or by a more sophisticated statistical method. The second of the F identification numbers (1 through 5), for example the number 2 of F4–2, each indicates a vertical level of the character and a reduction circuitry (hereinafter referred to as RC) channel associated with these respective levels. By way of example, consider the numeral "1" (whose configuration is shown in FIG. 3) and whose features are included in the upper left block 14 of FIG. 2. It is apparent that the numeral 1 does *not* have a long, top stroke so that the feature $\overline{\text{F1}}$–1 is a likely choice. Feature $\overline{\text{F1}}$–1 indicates "not" by virtue of the bar notation; "top of the character" by the second identification number "1"; and "long stroke" by the first identification number "1."

As the numeral "1" is read, the inked area is passed from right to left under the read head; therefore, the inked area of the numeral "1" will be considered as being on the right-hand side, despite the fact that an observer viewing the numeral "1" would consider the inked area to be located in the middle of the space allocated for printing the numeral. However, the reading head is sensitive only to the change in magnetic flux resulting from the passage of the inked area thereunder and, therefore, so far as the read head is concerned, the space allocated to the numeral "1" does not begin until the vertical bar appears. Thus, the "1" appears to be on the right-hand side of the space allocated. Accordingly, there appears to be $\overline{\text{FS7}}$ (no FS7) in the numeral "1." That is, there appears to be no "ink in the center." On the other hand, the read head would sense the right-hand vertical bar 12 of the numeral "0" (shown in FIG. 3) as in fact being on the right-hand side. Returning now to the numeral "1," it is clear that in addition to having $\overline{\text{F1}}$–1 as a feature, the numeral "1" has feature F4, namely, a right-hand bar. However, if an individual reading head can only sense a short right-hand bar, then a long right-hand bar can be sensed by electronically adding a plurality of short right-hand bar signals. It has been found sufficient to recognize three features simultaneously at three adjoining levels to indicate the presence of a long right-hand bar. Since, as discussed above, the numeral "1" appears to the read head as having no "ink in the center" (see FIG. 4*a*, columns 3, 4 and 5) $\overline{\text{FS7}}$ is a reliable, useful feature. It is evident that other features could have been chosen. For instance, the numeral "1" has no left bar so that $\overline{\text{F6}}$ would have been a useful, reliable feature. However, all the useful, reliable features are not necessary to provide a sufficient set of features.

As was implied above, the chart of FIG. 2 is so filled in that each character differs from each other character by at least one useful, reliable feature. Having once established the necessary features as seen in the chart, the logic circuitry may be provided. It is evident from the chart that the long right bar of numeral "1" can be detected by the summation of three short, right bars. It has been established for the set of characters to be handled in the preferred embodiment presently described that it is sufficient to detect features at only five physical, vertical levels of the character. Therefore, five reduction circuit channels are requisite, with each channel being respectively associated with vertical level, and with each RC channel being capable of providing signal information regarding the six regular features, F1 through F6, listed in FIG. 2.

In addition, two signal channels are required for information regarding two special features, FS7, FS8, also listed in FIG. 2, and whose vertical levels are respectively determined by their definitions, as will be more fully indicated later on. Again, it is to be understood that other feature arrangements can be used and that it is only necessary to establish a sufficient set of features to enable the operation of the system. It follows then, from the chart of FIG. 2, that although there may be as many as ten read heads supplying signals, the ten signal channels associated therewith may be reduced to seven RC channels to accommodate the five vertical levels and the two special feature levels or locations.

If the suggested features from the chart are now considered with the decision rule, described earlier, we have the following coincident conditions to provide output signals for the characters "0" through "9," and the reject character, as used in the preferred embodiment of the present invention.

$$\Delta_1=\overline{F}1\text{–}1\cdot F4\text{–}2\cdot F4\text{–}3\cdot F4\text{–}4\cdot F4\text{–}5\cdot \overline{F}S7\text{–}6$$
$$\Delta^2=F1\text{–}1\cdot F4\text{–}2\cdot(\overline{F}1\text{–}3\cdot \overline{F}6\text{–}3)\cdot \overline{F}4\text{–}4\cdot F1\text{–}5\cdot FS7\text{–}6\cdot \overline{F}S8\text{–}7$$
$$\Delta_3=F1\text{–}1\cdot F4\text{–}2\cdot F2\text{–}3\cdot F4\text{–}4\cdot F1\text{–}5\cdot \overline{F}S7\text{–}6$$
$$\Delta_4=\overline{F}1\text{–}1\cdot \overline{F}1\text{–}5\cdot F8\text{–}7$$
$$\Delta_5=F1\text{–}1\cdot F6\text{–}2\cdot F1\text{–}3\cdot F4\text{–}4\cdot F1\text{–}5\cdot \overline{F}S7\text{–}6$$
$$\Delta_6=F1\text{–}1\cdot F6\text{–}2\cdot F1\text{–}3\cdot F3\text{–}4\cdot F1\text{–}5\cdot \overline{F}S7\text{–}6$$
$$\Delta_7=F1\text{–}1\cdot(\overline{F}1\text{–}3\cdot \overline{F}6\text{–}3)\cdot \overline{F}6\text{–}4\cdot F5\text{–}5\cdot \overline{F}S7\text{–}6\cdot FS8\text{–}7$$
$$\Delta_8=F1\text{–}1\cdot F3\text{–}2\cdot F1\text{–}3\cdot F3\text{–}4\cdot F1\text{–}5\cdot \overline{F}S7\text{–}6$$
$$\Delta_9=F1\text{–}1\cdot F3\text{–}2\cdot F1\text{–}3\cdot F4\text{–}4\cdot F1\text{–}5\cdot \overline{F}S7\text{–}6$$
$$\Delta_0=F1\text{–}1\cdot F3\text{–}2\cdot F3\text{–}3\cdot F3\text{–}4\cdot F1\text{–}5\cdot \overline{F}S7\text{–}6$$

$$\Delta\ \text{reject}=1-\underset{K=1}{U^{10}}\Delta K$$

It should be clear at this point that the set of features can be changed and expanded in order to meet the needs of a complete alpha-numeric system. The embodiment described herein, in which there are only ten characters to be recognized, 0–9, illustrates the inventive technique without unduly complicating the description.

Figure 1:
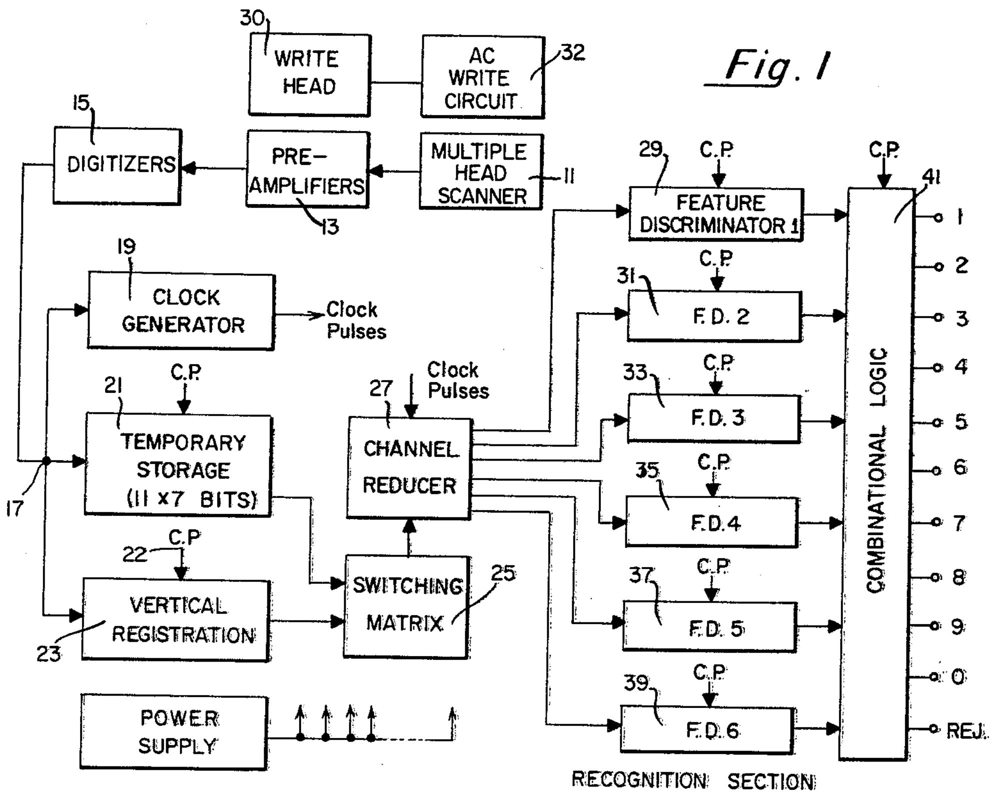
FIG. 1 is a block diagram of the over-all system.

Consider first FIG. 1, wherein there is shown a block diagram of the over-all system. In the preferred embodiment the system will be described with a multiple track magnetic reading head such as the magnetic reading head structure described and claimed in the co-pending application of Gottschalk et al., entitled "Multiple Reading Head," filed November 5, 1958, Serial No. 772,072, and assigned to Burroughs Corporation. However, so far as the present invention is concerned, scanner 11 could be an optical reading device instead of a multiple track magnetic reading head structure. The requisites for an optical reading device would be that the serial information obtained from a scan of the character should be translated into parallel signals, so that the parallel signals could be applied to the multiple and parallel signal channels of the present device.

In the present system, the characters are printed on the original document with magnetizable ink. The original document is then passed under a magnetic write head 30, which is coupled to an A.-C. write circuit 32. At the A.-C. write head station 30 the characters are subjected to an A.-C. magnetizing signal. Such an A.-C. magnetizing operation enables the reading station to generate A.-C. signals in response to the characters being transported therethrough. A suitable magnetic write head and associated A.-C. writing circuitry could be an oscillator device (30 kc.) in the preferred embodiment connected to a power amplifier which in turn is connected to drive a magnetic write head.

The character being read is passed horizontally under the vertically-aligned multiple magnetic reading heads of the scanner 11 and each reading head produces signals in accordance with changes of magnetic flux as the character passes thereunder. The center of each reading head is spaced apart vertically from the center of its adjacent reading head by a distance equal substantially to the width of a horizontal stroke of the printed character being read. It is possible, of course, to interchange different multiple reading heads for different styles or sizes of font.

After the information signals, representing character features, are produced by the parallel reading heads at multiple head scanner 11, these feature signals are passed along parallel channels to the pre-amplifiers 13 where the weak signals produced at the multiple head scanner station are amplified. As indicated previously, the magnetic characters being read were passed through an A.-C. writing station 30 whereat the magnetizable ink is magnetized according to an A.-C. pattern, thereby enabling a dynamic A.-C. signal to be produced by each of the individual reading heads. These various A.-C. signals are the signals which are initially passed through the parallel channels. Although an A.-C. signal is used to magnetize the ink in the preferred embodiment of the present invention, the invention technique of the present system can be used to recognize characters which have been D.-C. magnetized.

The signals, having been amplified (and the spurious signals filtered out) at the pre-amplifiers 13, are passed to the digitizers 15. At the digitizer station each A.-C. signal whose respective duration represents the length of a feature in a horizontal direction, is translated into a digitized signal having binary characteristics. In other words, if ink was present under the reading head, the digitizer converts the A.-C. signal induced in the read head into a rectangular voltage signal, which may be either relatively positive or negative, and which will be defined as a "one" condition. If no ink was present under the read head, no A.-C. signal is supplied to the digitizer, no rectangular signal is produced, and a "ground" voltage condition prevails, which will be defined as the "zero" condition. The signals, having been translated into digitized form, are passed along parallel channels to the junction 17 from whence the signals follow three different paths. As will become apparent later, the junction 17 is representative of many junctions each of which is associated with a parallel channel. It is appropriate at this point, to deal with a singular operation to introduce the general operation of the system. When the first digitized signal is received on any particular channel, this digitized signal is passed to the clock generator 19 to initiate clock pulses which effect synchronization through recognition system. The clock pulses, indicated in FIG. 1 include all timing pulses, such as reset pulses, shift pulses, transfer pulses, etc., each of whose particular function will be more fully explained later. Each character is considered to be divided up into seven vertical columns. The choice of seven is an arbitrary choice and may be some other number. The clock pulses emanating from the clock generator 19 provide means for counting seven clock pulse times to coincide with the seven vertical columns. At the end of the seventh clock pulse, the system has obtained all the information which can be read from a particular character. The information is then further processed to determine the character's identity.

Clock pulses are also passed from the clock generator 19 to the temporary storage device 21, which simultaneously receives the digitized pulses from the digitizers 15. In a preferred embodiment, the temporary storage device 21 is a shift register (actually a plurality of shift registers with one for each channel) which advances information-bit signals in response to the application of the clock pulses. As the digitized signals come from the digitizers 15, they enter the associated temporary storage device 21 and are advanced with the clock pulses. For instance, if there was an A.-C. signal representing the middle horizontal stroke of the number "3," this would be an A.-C. signal of medium length and would be translated by digitizer 15 into a rectangular signal (a "one" signal) of medium length, which would be quantized or separated into three individual bit signals in the associated temporary storage device 21 in response to the clock pulses. In summation of the description thus far, the feature signals on each of the various channels are translated to standardized bit signals and stored in the temporary storage device 21.

The signals from the digitizers 15 are also passed from junction 17 along parallel channels to the vertical registration device 23. Simultaneously with the reception of the digitized signals at the registration device 23, three special timing pulses are received from the clock generator 19. These three pulses (indicated as clock pulses 22), are designated specifically as: reset pulse #1, transfer pulse, and reset pulse #2. In effect, the vertical registration device 23, in a preferred embodiment, is a special two-step shift register which includes an intermediate stage. The first step of the two-step operation enables the system to detect each channel which has read inked information and to temporarily store this detected information. As will be more fully understood hereinafter, there will always be at least one channel which has not read inked information. At the intermediate stage of the vertical registration station 23, the channel which read inked information in a selected period and which has an adjacent channel which simultaneously did not read inked information in this selected period is then detected. When this detection is made, the system with the aid of the transfer pulse designates at the second step of the special shift register that the channel reading inked information adjacent the non-reading channel is the channel reading the top of the character. This becomes the reference feature. Although in the preferred embodiment, the reference feature is the top of the character, it is of course possible that some other reference feature, such as the bottom of the character, or the middle of the character, could be used.

After the information is processed at station 23 and the reference feature signal determined, the reference feature signal is then transmitted to the switching matrix station 25. Simultaneously with the reception of the reference feature signal, there is also received at the switching matrix 25 the information bit signals which have been stored at the temporary storage station 21. The clock pulse operation to effect the transfer of the information bit signals will be more fully explained hereinafter.

The switching matrix 25 functions to align the information (feature) bit signals with respect to the reference feature bit signals, so that the features (in the form of representative signals) of the character being read will assume their unique related positions and thereby provide a basis for recognition.

For example, the information which entered the temporary storage station 21 on the parallel channels may have been arbitrarily arranged due to the arbitrary registration of the character so that the top temporary storage position (corresponding to the physical top channel) might actually be storing information-bit signals corresponding to the middle of the numeral or character. The information, therefore (as will be more fully understood by the detailed explanation hereinafter(, must be aligned so that the switching matrix 25 will deliver from the channel designated as the top of the character, signal information in fact derived from the top of the character. The switching matrix 25 can be any one of a number of well-known types of switching arrangements, such as a diode matrix. In the preferred embodiment, the switching matrix comprises a plurality of coincident devices, as will be described. Having aligned the signals with respect to the reference signal at the switching matrix station 25, the system transmits the aligned feature signals to the channel reducer device 27.

As was explained in the above briefly discussed philosophy of character recognition, all of the reliable, useful features of a particular character are not necessary for recognizing the character. At the channel reducer station 27, the feature signals coming from the parallel channels are selectively grouped to give improved reliability as to feature identification and are reduced in number to save equipment. However the reduced features are nonetheless useful, reliable feature signals which will represent sufficient information to give high reliability in identifying any of the characters which the system is expected to handle. Obviously, if the character recognition system operation is expanded to include alphanumeric characters, the channel reducer station would not be employed to reduce the features to the extent shown in the preferred embodiment of the present invention. The design of this particular station must be determined by the magnitude of operation expected of the character recognition system and the various styles of printing that it is expected to handle.

Having processed the signals to provide aligned, useful and reliable feature signals, the output signals from the channel reducer station 27 are passed to six feature discriminators 29, 31, 33, 35, 37 and 39, at the first five of which the information bit signals appearing on the first five channels from the channel reducer are processed in an identical manner. The output signals from these five feature discriminators (29, 31, 33, 35 and 37) will respectively indicate that a feature which is being read by any particular channel is possibly a long stroke, or a short right bar, or a short left bar, etc. For the sixth and seventh channel coming from the channel reducer 27, there is provided a special feature discriminator 39 which is capable of indicating a special long stroke and/or ink in the center, as will be more fully explained hereinafter. The output signals from the feature discriminators will provide the necessary feature information to recognize all of the characters.

After the feature information has been defined and more clearly designated in the feature discriminators as long stroke, short bar, etc., this information is passed to the combinational logic circuitry 41 wherein the features are combined to give complete recognition of the numerals "0" through "9"; and failing to provide any of these, the logic circuitry indicates a rejection of the particular character being read.

*Detailed operation*

In the following description it will become apparent that the logic circuitry includes a plurality of "and" gates and a plurality of "or" gates. The "and" and the "or" gates throughout will be understood to follow the rule that an "and" gate accepts only positive input signals and provides a negative output signal, while an "or" gate accepts only negative input signals and furnishes a positive output signal. Obviously another type of ("and" and "or") gate arrangement could be used but in accordance therewith the logical circuits would be different from that shown with the preferred embodiment.

A typical gate circuit which can be used for both the "and" gate and the "or" gate is described in the co-pending application entitled "Switching Networks," by Howard E. Tompkins, Serial No. 612,848, filed September 28, 1956, and assigned to the Burroughs Corporation.

In FIG. 3 are shown the shapes of the particular numerals, or characters, which in the preferred embodiment, are to be recognized by the system. Again it should be stated that other sets of numerals, or characters, with different shapes can be recognized by the present system provided there is determined a sufficient set of features for the other sets of characters. If a set of sufficient features for the other characters is determined, then appropriate logic circuitry can be included in the system to fit this last-mentioned set of sufficient features.

In order to examine a detailed operation of the present system, consider the various functions of the system when a character or numeral "6" is being read and recognized by the system. Examine first the FIGURES 4*a* and 4*b* wherein there is shown the numeral "6" as it might be printed in magnetic ink on a document (although the numeral is enlarged many times for illustrative purposes). In FIG. 4*a*, the numeral "6" is shown with the multiple read heads 16 positioned to perform an ideal scan of the numeral. Such a scan is considered ideal because the centers of the appropriate heads travel squarely along the middle of the horizontal printed lines of the character. For instance, an examination of the respective positions of the heads 43, 45 and 47, with respect to the horizontal printed lines or strokes, 49, 51 and 53, will reveal that when the numeral "6" is transported through the read station, the printed lines, or strokes 49, 51 and 53 will respectively pass squarely under read heads 43, 45 and 47. In FIG. 4*b* there is shown the same character, or numeral, "6," aligned differently with the read heads 18 than it was aligned with respect to the read heads 16. In FIG. 4*b* the centers of the read heads 18 are not aligned to travel squarely along the middle of any of the particular horizontal printed lines or strokes. In point of fact, the middle of a stroke, for instance, the dashed line 55, is seen to be a line lying between the read heads 57 and 59. As can be seen in FIG. 4*b*, it will be necessary to include ten read heads in order that all the flux from the inked area which makes up the numeral "6" can be sensed by the read heads. Also in FIG. 4*b* there is shown an eleventh read head 58, since as was suggested earlier, there is a need for providing a read head, or reading position, which does not sense any inked area in order that a reference feature can be determined. The principle of this operation will be more fully explained hereinafter. The additional read head 58 is depicted in FIG. 4*b* as the eleventh read head. If there would be an assurance that the numeral "6" would always be positioned with respect to the read heads, as shown in FIG. 4*a*, there would be very little need for registration circuitry. However, because of irregular printing on the document, or the transport equipment of the system, the numerals or characters will usually be aligned with the read heads in some position between the position shown in FIG. 4*b* and the position shown in FIG. 4*a*. It is therefore necessary to provide ten read heads which can sense inked area to get all the information available, and an eleventh read head which will not sense inked area, to determine the reference feature suggested above.

Recalling now that the numeral "6" was printed with magnetizable ink and was passed through an A.-C. writing station wherein the magnetizable ink was magnetized according to an A.-C. pattern, consider the signals which are produced by the individual read heads and the ultimate paths of these signals through the system. In FIG. 4*b* the magnetic read heads 57 and 59 will each be producing to some degree (in accordance with the amount of inked area passing under each head), an A.-C. signal for the complete length of the top stroke 61 of the numeral "6." The read heads 57 and 59, in response to the A.-C. flux, will produce an A.-C. signal which will continue for the time of the scan of the seven imaginary columns $C_1$–$C_7$ of the character grid, and as will be apparent later, for the time of seven clock pulses. The heads 62 and 64 will be producing an A.-C. signal for the width of the seventh column $C_7$ as these two heads pass over the left-hand bar 60 of the numeral "6." The heads 66 and 68 will be producing an A.-C. signal for the length of the middle long stroke 63. The heads 70 and 72 will be producing two (bursts) A.-C. signals as these heads cross the right-hand bar 65 and the left-hand bar 67. Lastly, the heads 74 and 76 will be producing an A.-C. signal for the duration of the scan of the seven columns $C_1$–$C_7$ as these last two heads pass over the lower long stroke 69.

Figure 7:
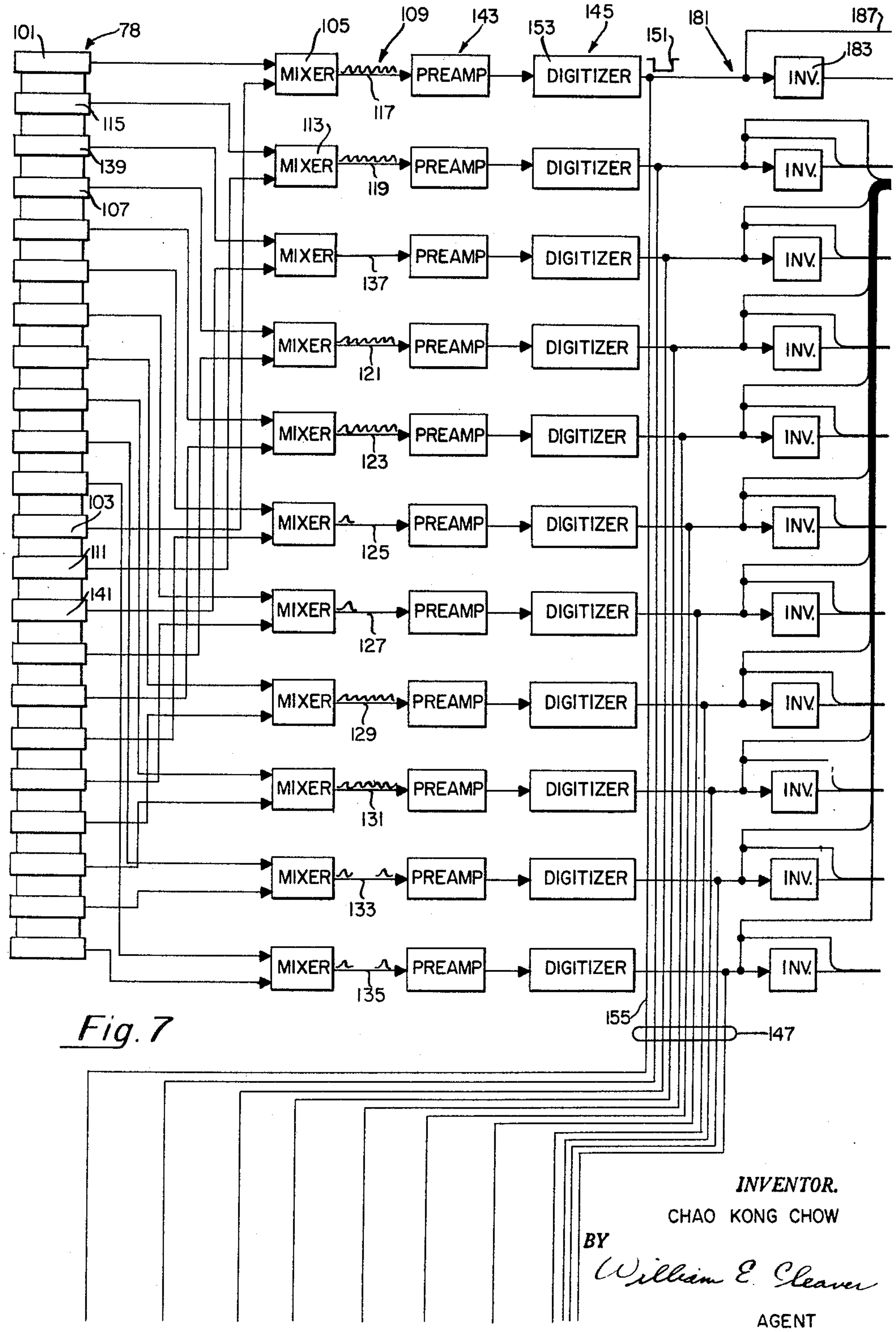

Referring now to FIG. 7, before the A.-C. signals generated in the read heads are passed to their respective pre-amplifiers they are passed through an associated mixer. An examination of FIG.7 will show a multiple track reading head structure 78 comprising a plurality of individual heads. In FIG. 7, there are shown twenty-two individual read heads. It will be noted that the first read head 101 is coupled with the twelfth read head 103 to a mixer 105. In the actual system, there are fifty-five read heads in the multiple track head structure. The number of read heads employed can be altered depending upon the registration problems of the system. Every $(N+(A)(11))^{th}$ head, where N is any number 1 through 11 and after N is fixed A is any whole integer including zero, is coupled together. For instance, the first hand, twelfth head, and twenty-third head, etc. are coupled to the same mixer. The circuitry which connects each $(N+(A)(11))^{th}$ read head to an associated mixer makes it possible for information from a character to be transmitted to as few as eleven channels irrespective of the character's position under the twenty-two read heads. By way of example, consider that the top position of the numerical "6" is being read by the fourth read head 107 in FIG. 7. If the numeral "6" were so positioned that the fourth read head 107 was actually reading the top stroke and there were ten consecutive read heads necessary to read the character, as shown in FIG. 4*b* and discussed earlier, then the bottom of the character would be read by the thirteenth read head 111. It will be noted, according to the "$(N+(A)(11))$" rule mentioned above, that the signal lead from the thirteenth read head 111 is connected to the same mixer 113 to which there is also tied the second read head 115.

To further illustrate the operation when the numerical "6" is positioned so that the fourth read head 107 actually reads the top of the character, some typical waveforms have been shown on the channels 117, 119, 121, 123, 125, 127, 129, 131, 133 and 135. It will be noted in FIG. 7 that the channel 137, the third channel, has no signal thereon because, in point of fact, neither the third read head 139 nor the fourteenth read head 141, the latter being the $(N+(A)(11))^{th}$ read head where $N=3$ and $A=1$, has had any inked area passed thereunder.

After passing through the registration circuitry to provide A.-C. signals on the eleven chanels 109, these A.-C. signals are respectively passed to an associated pre-amplifier and digitizer circuit. FIG. 5*a* shows in block form the pre-amplifier digitizer arrangement, and FIG. 5*b* shows the waveforms at critical positions in the circuit of FIG. 5*a*. When an A.-C. signal from one of the read heads is passed, by way of one of the mixers, to its associated pre-amplifier, identified in FIG. 5*a* by the reference numeral 71, the A.-C. asignal is amplified thereat. The A.-C. signal is then passed to the junction 73. A typical A.-C. waveform at junction 73 is shown in FIG. 5*b*. The A.-C. signal from the junction 73 is transmitted along parallel paths to a half-wave rectifier 75 and to an inverter half-wave rectifier 77. The half-wave rectifier 75 and the inverter half-wave rectifier device 77 may be any of the well-known devices which perform these operations, such as those described in the MIT Radiation Laboratory Series published by McGraw-Hill, 1947 to 1953. The signal which will be transmitted from the half-wave rectifier along lead 79 is the positive half of the sine wave as shown by the "lead 79" waveform of FIG. 5*b*. The negative half of the sine wave will be transmitted from the inverter and half-wave rectifier 77 along lead 81, as shown by "lead 81" waveform in FIG. 5*b*. The signals respectively transmitted along the leads 79 and 81 are passed to the mono-stable multi-vibrator and threshold devices 83 and 85. These devices are also well-known and suitable circuitry therefor may be found in the Radiation Laboratory Series mentioned above. The threshold device in the preferred embodiment has a fixed and an automatic adjustable value. The fixed value controls weak signals while the automatic adjustable value is a fixed percentage of the incoming signal thereby controlling the noise effect. The fixed and automatically adjustable threshold signals are advanced to each of the devices 83 and 85 by way of the chanel 86. If the amplitude of the A.-C. signal is sufficiently large to overcome the threshold levels, a signal will be applied to the mono-stable multivibrator portion of the devices 83 and 85, and as a result the rectangular signals shown in FIG. 5*b* will appear on leads 87 and 89. The rectangular signals transmitted from the mono-stable multi-vibrators will be mixed by the mixer device 91 and the output therefrom will appear on the channel 93, as shown by the pulses 95, 97 of FIG. 5*b*. By the means just described, the A.-C. signal generated in the read head is translated into a digitized form and thus the inked area represented by the recorded A.-C. signal is translated into a pulse or binary voltage condition. In FIG. 5*b* the voltage amplitude of the rectangular signals 95 and 97 represents a "1" condition, and the voltage level 99 represents a "0" or "no ink" condition. In FIG. 5*b*, the rectangular signals 95 and 97 are shown having a voltage amplitude in a positive sense. Actually, the digitized signal may be either positive or negative, and as will become apparent in the later discussion relating to FIG. 7, the digitized signal used in the preferred embodiment has a negative voltage sense.

In order to continue with an examination of the signals as they pass through the system, it is advisable at this point to place the FIGS. 7, 8, 9, 10, 11, 12, 13, 14 and 15 according to the arrangement shown in FIG. 16.

As has already been indicated, the A.-C. signals which are appearing on the channels 109 in FIG. 7 are transmitted to the bank of pre-amplifiers 143 and the amplified signals from the pre-amplifiers 143 are passed to the bank of digitizers 145. At each of the digitizer positions, the A.-C. signals are translated into digitized or binary form, as explained in connection with FIGS. 5*a* and 5*b*.

From the digitizers 145, the binary signals are passed simultaneously along two paths. Consider first the path (downward) of the binary signals along the cable represented by looped lines 147 toward the bank of flip-flops 149, in FIG. 8. The leading edge of the digitized signal on each of the respective channels will transfer the associated flip-flop in the bank 149 to its "1" side. In other words, the negative pulse or digitized signal 151, as shown in FIG. 7 as being transmitted from the first channel digitizer 153 will be transmitted along the lead 155 of cable 147 and its leading edge will transfer the flip-flop 157 to its "1" side. In like manner the flip-flop associated with each channel whose head has read any inked area, (and therefore each of the channels upon which a digitized signal appears), will be transferred to its "1" side. In accordance with the example we are presently considering (reading the numeral "6" with the top feature passing under the fourth read head 107), the read head of each of the channels has read some inked area excepting the third channel, and therefore the flip-flop 159, which is associated with the third channel, remains in its "0" state.

Figure 8:
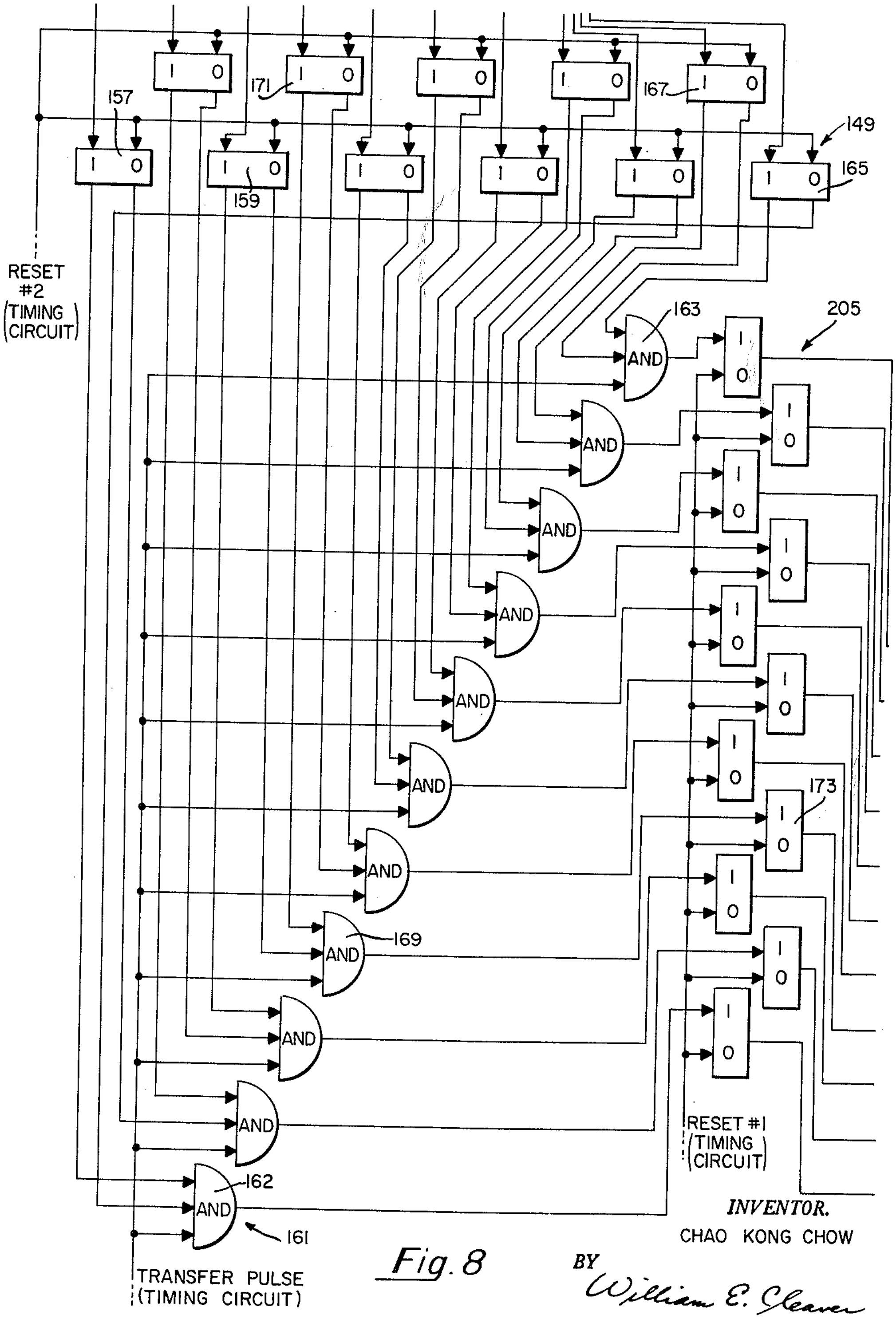

Connected to the bank of flip-flops 149 is a bank of coincident devices or "and" gates 161 (FIG. 8). The input leads to each "and" gate are respectively connected to the "1" side of a first flip-flop and the "0" side of a second flip-flop, these first and second flip-flops being associated with adjacent channels. For example, an examination of the "and" gate 163 in FIG. 8 reveals that one of its input leads is connected to the "1" side of the flip-flop 165 and its other input lead is connected to the "0" side of the flip-flop 167. The flip-flops 165 and 167 are respectively associated with adjacent channels, namely, the eleventh and tenth channels. In the present example, since each of the flip-flops in the bank 149 is transferred to it "1" side excepting the flip-flop 159 (associated with the third channel), only the "and" gate 169 associated with flip-flop 159 will be conditioned to provide an output signal. The output signals from the "on" sides of the flip-flops in the registration circuitry are considered positive. The "and" gate 169 is connected to the "0" side of flip-flop 159 and to the "1" side of flip-flop 171. It will be seen, by tracing the circuitry in FIGS. 7 and 8 that the flip-flops 159 and 171 are associated with adjacent channels, the flip-flop 171 being associated with the fourth channel and flip-flop 159 being associated with the third channel.

Figure 10:
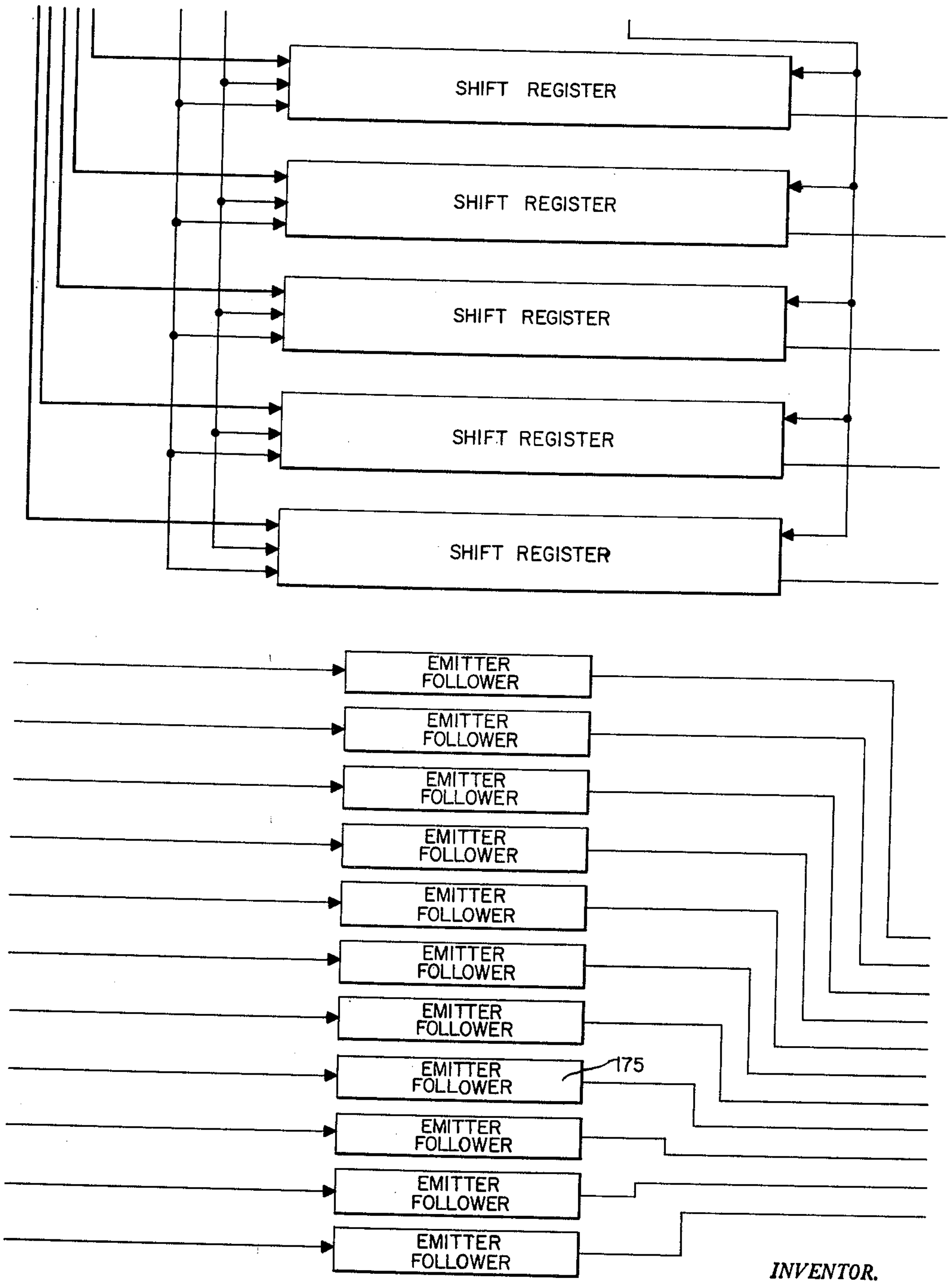

In response to an output signal from the "and" gate 169, the associated flip-flop 173 of the bank of flip-flops 205, is transferred to its "1" side and the output signal therefrom is passed to an associated emitter-follower 175 in FIG. 10. The output lead of the emitter-follower 175 is designated in FIG. 12 as $C_4$ (control line #4). It will be recalled that in our present example, the fourth reading head 107 is the reading head which is actually reading the top feature of the character. We now see that in response to the absence of signal (no ink present) at the third channel and the presence of a signal (ink present) on the fourth channel, the lead $C_4$ from the emitter follower 175, associated with the fourth channel, becomes the only lead having a control signal thereon and in this manner we have identified channel 4 as the channel whose read head is reading the top of the character, or the reference feature.

Figure 12:
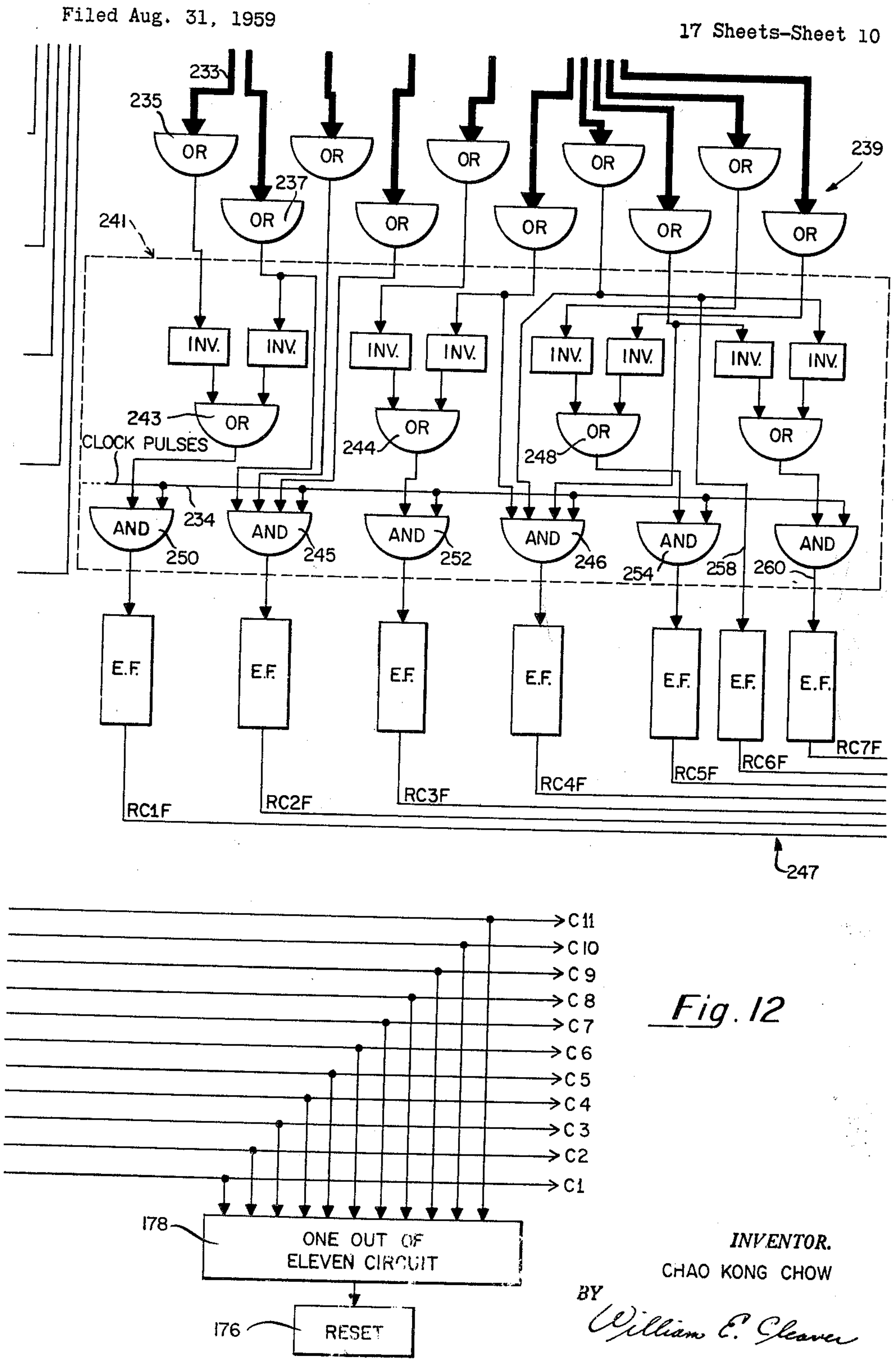

Summarizing the operation described thus far, the determination of a reference feature is accomplished by effecting, at some particular "and" gate which has an associated channel designation, coincidence between a signal from a channel which is reading ink and a signal from an adjacent channel which is not reading ink. In our example the read head not reading ink must lie above (toward head No. 1) since we have chosen the reference feature as the "top of the character." If the "top of the character" actually passes under the first read head so that there is not provided a channel or read head lying above which is not reading ink, the system still will work properly because the eleventh read head is connected to the same "and" gate 162 (in the bank 161) as the first read head. Therefore the combination of a channel reading ink associated with an adjacent channel not reading ink exists between channel 1 and channel 11. By tracing the circuitry in FIG. 8 from the flip-flops 157 and 165 respectively associated with the first channel and the eleventh channel it becomes apparent that the lead $C_1$ in FIG. 12 is conditioned with a control signal thereon when channel 1 reads ink and channel 11 does not read ink. Although all ten channels were used in reading the numeral "6" in our illustrative example, if only nine of the reading heads were activated by the numeral "6," as it passed under the read heads (according to FIG. 4*a*) a similar operation of conditioning some channel designated "and" gate would result. In other words, even though there would be two channels not reading ink, there would only be one "and" gate which is conditioned by a read head reading ink, which has an adjacent read head not reading ink.

Figure 11:
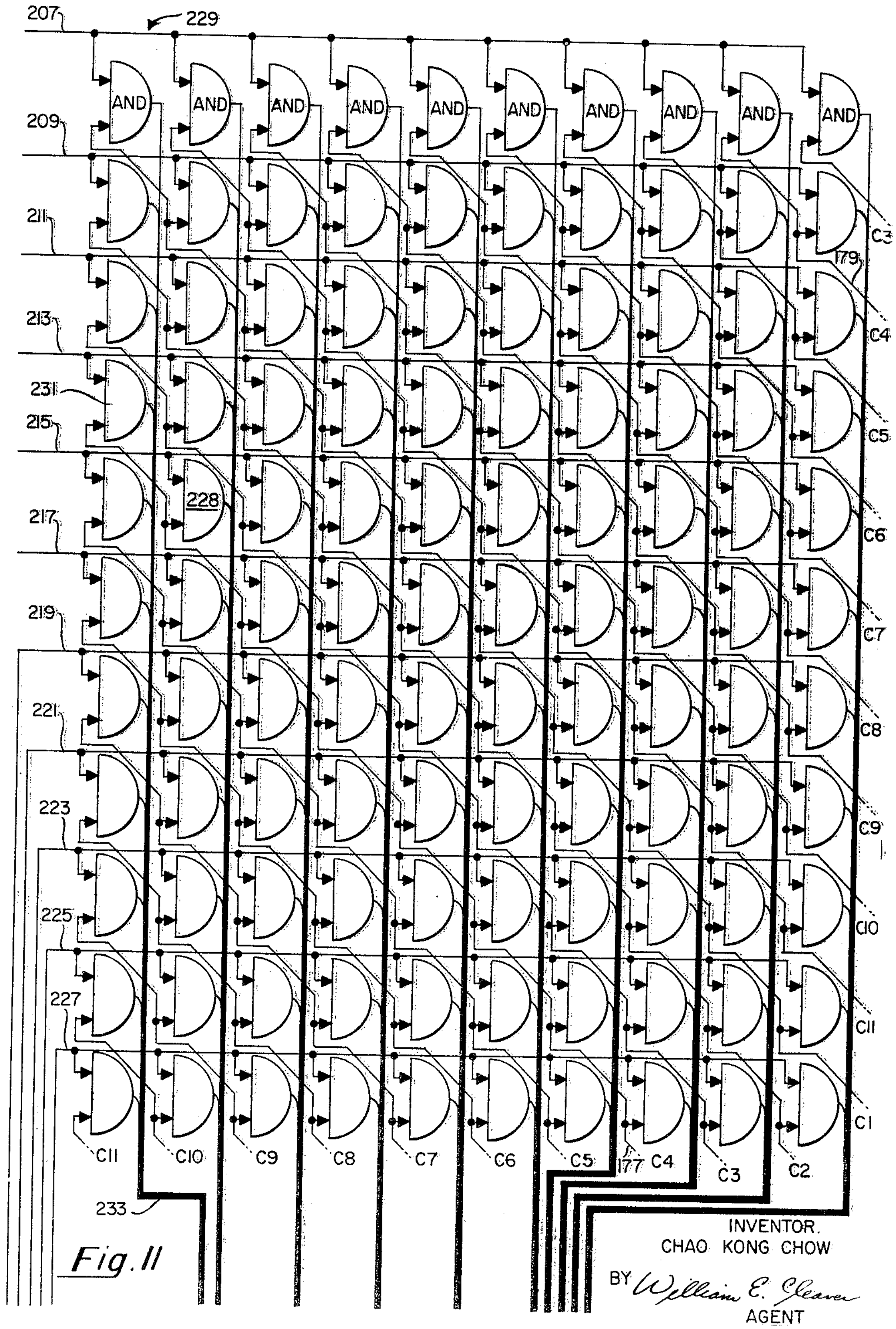

In response to the lead $C_4$ providing a voltage thereon which, in the preferred embodiment, is positive, each gate of a certain set of "and" gates, or coincident devices, in FIG. 11 is partially conditioned toward providing an output signal. The lead $C_4$ is shown in FIG. 11 at 177 and 179, and it is to be understood that this is electrically the same lead as that identified as $C_4$ in FIG. 12. Having followed in the preceding description, the signals and circuitry to partially condition the proper "and" gates in FIG. 11, consider now in detail the digitized information signals and their paths through the shift registers to the output lines therefrom which form the other input leads to the partially conditioned "and" gates of FIG. 11.

In FIG. 7, the digitized information signals are passed to a bank of inverters 181 to be inverted thereat, while along a second path the information signals are simultaneously shunted around the inverters. Each of the shunted digitized signals is passed to the "or" gate 191 in FIG. 9 from whence a signal is transmitted along the lead 193 to initiate the outputs from the itming circuit 194. The details of the timing circuit 194 will be dealt with hereinafter, and for purposes of the discussion, at this point, of the overall system it should be considered that the timing circuit provides timing pulses as needed to make the system synchronously operate.

Consider the output from the inverter 183 in FIG. 7 as being representative of each of the inverters in bank 181. The output from 183 is transmitted to partially condition the "and" gate 189 in FIG. 9, while simultaneously the digitized signal shunted around the inverter 183 along the line 187 is passed to partially condition the "and" gate 185. Simultaneously, there are shift pulses transmitted from the timing circuit 194 in FIG. 9 along the line 195 to the "or" gate 197. These shift pulses provide an output signal from the "or" gate 197 and, when present, condition the other input leads of the "and" gates 185 and 189. If there is a negative signal output from the digitizer 153 in FIG. 7, for instance the signal 151, the signal from the inverter 183 will be positive and, therefore, the "and" gate 189 will be conditioned to provide a negative output signal at shift pulse time. In a complementary fashion, the negative signal 151, shunted around the inverter 183 by means of the line 187, inhibits the "and" gate 185. With the arrival of a shift pulse at gate 189, a negative pulse is transmitted to the first flip-flop 199 to transfer that flip-flop to its "1" side. If, however, instead of negative signal 151, there is a "no ink" signal output from digitizer 153, a relatively positive signal will be shunted around the inverter 183 to condition the "and" gate 185, a negative signal will be applied from inverter 183 to gate 189, and with the arrival of a shift pulse at gates 189 and 185, gate 189 will be inhibited while gate 185 will deliver a negative pulse to transfer flip-flop 199 to its "0" side. It is assumed in connection with the flip-flops shown in the shift register 201, that, for the purposes of the present description, the output from a conducting side is positive, while the output from a non-conducting side is negative. This means that when the flip-flop 199 has been transferred to its "1" side, a positive voltage will be applied to the "0" side of the next flip-flop 203, while a negative voltage will be applied to the "1" side of the flip-flop 203. A more detailed description of the flip-flop used in the shift register of the preferred embodiment will be given hereinafter. It is sufficient to state here that the flip-flops in the shift register 201 are so arranged that, in response to shift pulses from the timing circuit 194 applied to the individual stages of the shift register 201 (except the first stage 199) by way of lead 200, each of the flip-flops is transferred to the side which has the negative potential applied thereto from a previous stage. Other well-known shift register arrangements can be used, obviously.

As the next shift pulse comes through the "or" gate 197, (and providing that the digitized signal from digitizer 153, such as signal 151, is still in a negative state), flip-flop 203 will be transferred to its "1" side, while the flip-flop 199 will remain in its "1" side. If the digitized signal 151 has a length of seven clock pulses, or seven columns (FIGS. 4*a* and 4*b*), then seven "1's" will be stored in the shift register 201, according to the operation just described. Consider other possible conditions for the moment, for instance, that a "no ink" signal is transmitted from the digitizer 153 after a "1" has been entered into the flip-flop 199. The "no ink" signal is shunted around the inverter 183 and will appear as a relatively positive voltage which will condition the "and" gate 185 to provide, at shift-pulse time, a negative output to transfer the first flip-flop 199 to its "0" side. On the other hand, if there had been a "0" condition already in the flip-flop 199, then at the said shift pulse time, the flip-flop 203, in response to the shift pulse applied by way of lead 200, would be transferred to its "0" side since the "1" side of 199 would apply a negative potential to the "0" side of 203, and according to the above discussion, the flip-flops of 201 are transferred to the side whereat the negative potential from the previous stage is applied.

In effect a digitized signal is quantized, or broken down, at the shift register, into standard bit signals and stored in the shift register as such. The standard bit signals will be referred to hereinafter as IP (ink present) bit signals and NIP (no ink prsent) bit signals. It will be recalled (see FIGS. 4*a* and 4*b*) that the character is divided physically into seven columns, and the seven columns are respectively represented by the seven shift register positions. A reconsideration of the operation of the registration circuitry, FIG. 8, described before, will make it clear that the determination of the reference feature does not occur until the end of the character scan. In other words, the system does not determine which channel (or channels) has failed to read ink until the scan has been completed. While the digitized signals are being quantized and stored into the shift register, the vertical registration circuitry is examining the channels and it is at the end of the scan that the registration circuitry determines which of the channels have been reading inked areas and which one (or ones) has not. At the end of the scan, the information, relating to which channels have been reading inked areas and which one (or ones) has not, is stored in the bank of flip-flops 149 in FIG. 8. Shortly after the seventh clock pulse time, there is provided, by timing circuit 194, a reset pulse #1 which clears the flip-flops of the bank 205. Following the reset pulse #1 which cleared the bank 205, there is provided from timing circuits 194 a transfer pulse which transfers the signal stored in flip-flops 149 via the properly conditioned "and" gate of the bank 161 to the proper flip-flops of the bank 205. This is the intermediate stage mentioned before. Following the transfer pulse, at a discrete time, timing circuit 194 provides a reset pulse #2 which rests the flip-flops of the bank 149 to their respective "0" sides to ready this bank of flip-flops for recognition of the next character. According to this operation, one of the flip-flops of the bank 205, which in our example is flip-flop 173, is transferred to the "1" side for the entire scan of the second, or subsequent character. The relationship between the timing pulses can be seen on FIG. 17.

In summation of the discussion thus far, the signals generated in the read head have been transmitted and stored as follows: the digitized signals representing the features of the numeral "6" have been placed in the shift register in standardized information (either IP or NIP) bit form, and there has been a recognition of the reference feature, namely, the top reading channel $C_4$. More specifically, in the present example, the fourth read head has been identified as the head reading the top of the character.

During the reading of the subsequent character, that is, the character following the numeral "6", the same operation as just described will take place, and an additional operation of transferring the information stored in the shift register to the switching matrix of FIG. 11 is accomplished. As each shift pulse comes through to store the standardized information bit signals of the following character, the information bit signals already stored in the shift register are transferred therefrom along the information lines identified by the odd-numbered reference numerals 207 through 227 of FIG. 11. In our particular example, the line $C_4$ associated with the fourth read head was conditioned positive so that with respect to the "and" gates of column 229, the fourth "and" gate 231 will be primed or partially conditioned (toward producing a negative output pulse). Thereafter, the information IP bit signals coming, or appearing on the information line 213 coming from the fourth shift register 204 in FIG. 9 will fully condition the "and" gate 231 in FIG. 11 and there will result a negative output signal which will be applied by way of the appropriate conductor of cable 233 to the "or" gate 235 in FIG. 12. In a like manner, the information on the line 215 associated with the fifth shift register 206 in FIG. 9 will be transmitted through the "and" gate 228 in FIG. 11 to the "or" gate 237, etc. It will be understood from what has previously been said that where the character feature read by the head persists for a number of columns (FIGS. 4*a* and 4*b*) the output from the shift register will be a continuous IP signal. For example, the top stroke of the numeral "6" persists for seven columns. In reading the resulting signals into the shift register, the first stage is transferred to a "1" at shift pulse time corresponding to column $C_1$ and then remains in the "1" state during the next six shift pulses (corresponding to columns $C_2$–$C_7$) during which the stages of the shift register successively shift to the "1" state, thus filling the register with "1's". Thereafter, in shifting the next signal into the shift register, the resident signal is shifted out and in so doing the last stage (in the present example) remains in the "1" state for seven shift pulse times. Thus, the output, in effect, is a continuous IP signal.

In accordance with the above-described cyclic switching operation, it will be seen that the information which has been read from the top of the character will be transmitted through the "or" gate 235 in FIG. 12 irrespective of which particular read head has read the top of the character. The information from the bank of "or" gates 239 is then transmitted to the channel reduction circuitry 241.

The continuous IP signals transmitted to the reduction circuitry are reconverted to pulses by coincidence with the clock pulses appearing on line 234 at the "and" gates 250, 245, 252, 246, 254 and 260. This coincidence at clock pulse times places the information IP bit pulses back in synchronism with the "*d*" pulses (FIG. 17). Such synchronism is necessary at the feature discrimination circuitry, as will become apparent hereinafter. It is interesting to note at this point, after the information from the character which has been read is stored in the shift register and at the end of the character scan, at which time the reference feature lead for this stored character is determined, that immediately thereupon the proper gate of the cyclic switching circuitry in FIG. 11 is fully conditioned to conduct. This provides that even though the information in the shift register is advanced therefrom in response to shift pulses, the first information IP bit pulse will be advanced at the clock pulse time since the associated "and" gates in FIGS. 11 and 12 were conditioned and/or partially conditioned to conduct at the end of a previous cycle.

At the channel reduction circuitry 241, the ten active channels are reduced to seven output channels. The channel reduction circuitry is arranged according to the characters which are to be recognized by the system. Consider in the description immediately following that the read head which reads ink and which is adjacent to a read head not reading ink, is designated as the first read head and each of the read heads in the stack starting with the read head lying adjacent the first read head (and downward in FIG. 7), being consecutively designated 2 through 11. We have already noted that it is possible for the first read head to read the top feature, or for the first and second read heads to simultaneously read the top feature (each head reading a portion thereof), depending upon the character registration. As shown in FIG. 12, these two possible channels (first and second read heads) each of which might be transmitting top feature information, are combined at the "or" gate 243 so that the information can be combined if two channels are reading the information, or if only one channel is reading the information it will be passed through the "or" gate 243. The portion of the character covered by the first, or the first and second read heads, is considered as the first vertical level. At "and" gate 245 the second, third and fourth channels (signals from the second, third and fourth read heads) are combined to cover the second vertical level. The vertical levels overlap as is evident from the fact that the second channel is combined with the first channel to form the first vertical level while the second channel is also combined with the third and fourth channels to form the second vertical level. The character being read can be considered, in the present embodiment, to be divided into five overlapping vertical levels. The portions of the character covered by these respective vertical levels are determined by the read heads supplying signals to the "or" gate 243 (first level); the "and" gate 245 (second level); the "or" gate 244 (third level); the "and" gate 246 (fourth level); and the "or" gate 248 (fifth level).

In accordance with this reduction circuitry arrangement the feature signals are handled and utilized, in general, according to the examples described immediately below. At "and" gate 245, for instance, there must be a signal simultaneously on each of the three input channels and this coincidence is used to determine the presence of a short bar, either right or left. If there is a signal missing on one of these channels due to a bay, or opening, in the character formation, this absence of IP signal will negate the presence of a short bar. For the particular characters which are to be recognized in the preferred embodiment, the forms of which are shown in FIG. 3, combining the second, third and fourth read head channels at "and" gate 245 is a desirable arrangement. For some other set of characters a preferable arrangement might be found in making the gate 245 a two-out-of-three gate. The "or" gate 244 enables either the combining of information, or the individual transferring of the information, respectively from the fifth and/or sixth, reading head channels. The "and" gate 246 has three channel input leads and provides an output signal in response to coincidence of three IP signals from the sixth, seventh and eighth read heads for recognition of a short bar (or in the absence of at least one IP signal the presence of a bay, or an opening) as part of the character formation; said short bar lying within the fourth level. The "or" gate 248 operates similarly to the "or" gate 243, but the operation of "or" gate 248 and "and" gate 254 is in response to signals derived from the ninth and/or tenth read heads (for the character "6" due to the presence of a long stroke at the bottom of the character). The outputs from the "and" gates 250, 245, 252, 246 and 254 represent in essence five vertical levels of a character being read. As has just been briefly indicated and as will be more completely explained below, any of the first six features, F1 through F6 (FIG. 2), can be recognized on these five vertical levels. The five "and" gates 250, 245, 252, 246 and 254 are fully conditioned to provide output signals therefrom in response to clock pulses on line 234. The remaining two channels in the channel reduction circuitry handle signals which are confined to the special features FS7 and FS8 described below in connection with the channels RC6F and RC7F.

Figure 13:
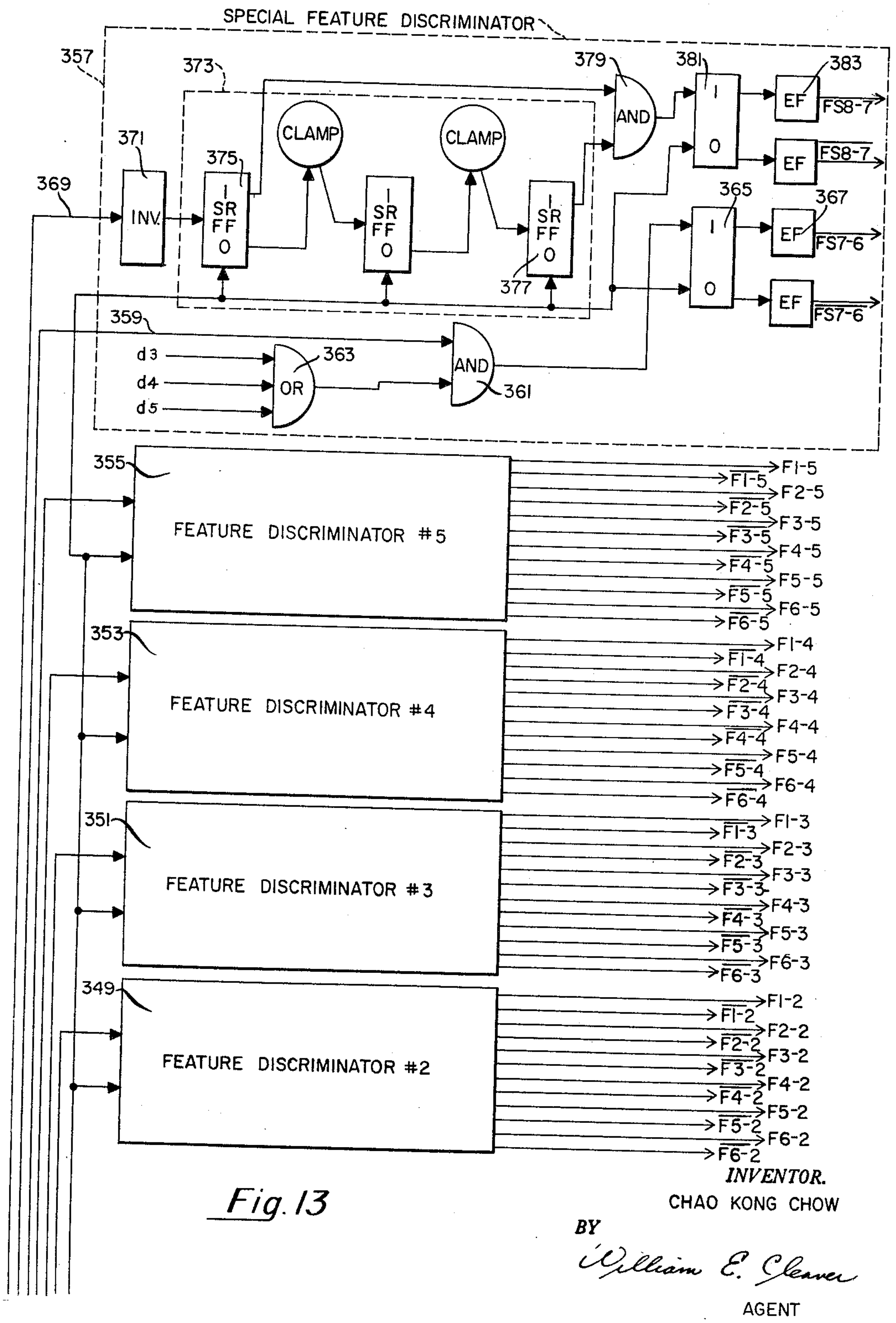
Figure 14:
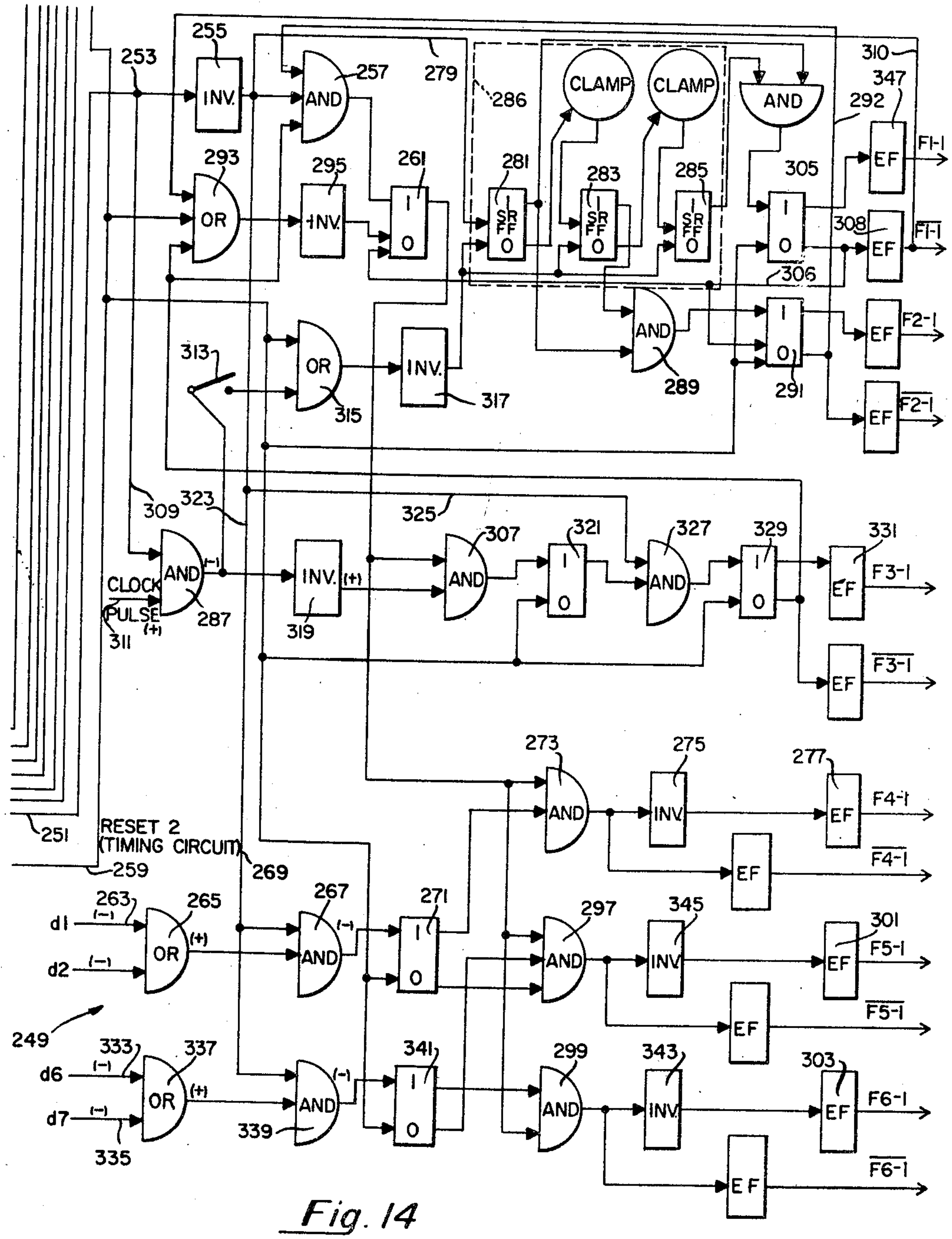

The output signals from the reduction circuitry are noted as RC, and appear at the bank of output leads 247. Each of the reduction circuitry channels is passed to an associated feature discriminator, the details of which are shown in FIG. 14. The schematic arrangement of the feature discriminator is also shown in FIG. 13.

Continuing with our example, that is, of tracing the signals produced and directed through the system in response to the numeral "6" being read, it can be readily understood that the lead RC1F in FIG. 14 will be carrying seven IP bit pulses representing the long digitized signal which is generated in response to the reading by the first, or first and second heads, of the long top stroke of the numeral "6." On the other hand, the lead RC2F is carrying one information IP bit signal generated by the second, third and fourth heads and corresponding to the left-hand bar of the numeral "6" at its associated (second) vertical level. Lead RC3F is carrying seven IP bit signals derived from the fifth and/or sixth leads due to the long stroke in the middle of the numeral "6" (the third level). Lead RC4F is carrying two spaced-apart IP bit signals separated by five bit positions derived from the sixth, seventh and eighth heads due to the two bars, right and left, of the bottom loop of the numeral "6" (the fourth level). Lead RC5F is carrying seven IP bit signals derived from the ninth and/or tenth leads due to the long stroke at the bottom of the numeral "6." Lead RC6F is associated with the special feature FS7 (FIG. 2) entitled "Ink in the Center." The word "Center" as used in the definition of the feature "Ink in the Center," whose presence is detected by the seventh read head, and whose signal appears on the RC6F lead, refers to the center of the character when measured along the columns. In other words as will be apparent hereinafter, the feature FS7, "Ink in the Center" is determined when there is ink lying in the third, fourth or fifth columns, which columns' relative positions can be seen in FIG. 4*b*. The feature FS7 is included to determine the numerals "2" and "7" which have ink lying in the area covered by the columns 3, 4 and 5, and also lying in the area covered by the seventh read head. When the numeral "6" is read there is no such "Ink in the Center" and as a result thereof there are no effective IP bit signals on RC6F. The lead RC7F accepts signals from the seventh, and/or eighth, read heads to provide a recognition of a long stroke FS8 in that portion of the character covered by the seventh, and/or eighth, read heads (see FIG. 4*b*). The feature FS8 which is found on the RC7F channel is primarily directed to detecting the long stroke of the numeral "4" whose formation can be seen in FIG. 3. When the numeral "6" is read there will be some IP bit signals from the two short bars which the seventh and eighth read heads detect and these signals will be passed along the RC7F lead, but as will become apparent hereinafter, these signals will become ineffective.

Having briefly discussed the IP bit information signals being transmitted over the RC channels, let us consider, as representative of the feature discriminator operation, what happens to the seven IP bit signals (corresponding to the seven columns C1–C7 in FIGS. 4*a* and 4*b*) which are passed to the feature discriminator 249, as shown in FIG. 14. At the end of the scanning cycle for numeral "6" of our example, there was applied from timing circuit 194 a reset pulse #2 along the channel 259 which resets each of the flip-flops in the feature discriminator 249 to is "0" side. The seven IP bit signals are transmitted serially over the RC1F channel to the common junction point 253 and to the inverter 255. The IP bit signals are in the form of negative pulses so that the first bit negative pulse which is transmitted to the inverter 255 is inverted into a positive signal and transmitted to the "and" gate 257. With each of the flip-flops on its "0" side because of the above-described reset operation, it becomes evident by tracing the circuitry that the "and" gate 257 (prior to receiving the pulse from the inverter 255) had two of its three input leads conditioned toward providing an output signal. Therefore, when the positive pulse from the inverter 255 arrives, the "and" gate 257 does not provide a negative output signal, thereby transferring the flip-flop 261 to its "1" side. The flip-flop 261 can be considered as the means for storing the information "short bar." In other words, if the input of the feature discriminator is a "short bar" irrespective of whether it is a right short bar, a middle short bar, or a left short bar, the flip-flop 261 will be transferred and will remain on its "1" side at the end of the transferral of the IP bit signals to the feature discriminator.

In the discussion of the feature discriminator thus far, the flip-flop 261 has been transferred to its "1" side in response to the first IP bit pulse arriving on channel RC1F. This will occur at $d_1$ time (FIG. 17) or first bit time, which corresponds with the right-hand side of the character. As shown in FIG. 14 a clock pulse at $d_1$ time from timing circuit 194 on the channel 263 will provide a positive output from the "or" gate 265 to the "and" gate 267. The "and" gate 267 will be fully conditioned to provide a negative output by coincidence of the positive IP bit signal transmitted along the line 269 and the $d_1$ pulse through the "or" gate 265. In response to this last-mentioned coincidence, the flip-flop 271 will be transferred to its "1" side. The flip-flop 271 can be considered as the element which stores the information "right" for the output of the feature discriminator, thereby enabling the discriminator to indicate a right short bar. In other words, it will be noted that the "1" condition (information "right") stored in flip-flop 271 is transmitted to the "and" gate 273, and the other input lead to the "and" gate 273 is conditioned by the "1" side of flip-flop 261 (information "short bar"). It has already been stated that the flip-flop 261 stores the information "short bar," and since the flip-flop 271 was transferred to the "1" side during $d_1$ time (alternatively, it could have been transferred to the "1" side during $d_2$ time), the "and" gate 273 becomes conditioned to indicate a "right short bar." The output from the "and" gate 273 can be initially considered temporary, that is it may be wiped out by subsequent IP bit signals. The output of the "and" gate 273 is inverted at the inverter 275 to drive the emitter-follower 277, and if at the end of the information transfer from the reduction channel circuitry the terminal F4–1 is "high," the feature discriminator will indicate that there is a right short bar present.

In point of fact, we know that eventually there is going to be a long top stroke transmitted to the feature discriminator in accordance with our example of reading the numeral "6." However, it becomes clear that at the end of the first IP bit signal, the feature discriminator 249 indicates that there is at least a right short bar since the flip-flop 261 is reading a "1," and the flip-flop 271 is reading a "1."

In addition to the first IP bit signal being transmitted through the "and" gate 257 to transfer the flip-flop 261, this first information bit signal is transmitted to, or shunted around, the "and" gate 257 by way of the line 279 to transfer flip-flop 281 to its "1" side. It should be noted here that, throughout the discussion of the circuitry, with the exception of the shift register flip-flops, the flip-flops which have input leads down connected to the center of the blocks indicate that the flip-flops are equipped with complementing input circuits so arranged that in response to each applied negative pulse the flip-flop will be transferred to its other state, whereas flip-flops which are represented by blocks having no central connection but only having individual inputs to the "1" and/or the "0" side will be transferred to the respective "1" or "0" side only when there is a negative pulse applied to the associated particular input lead. The shift register flip-flops designated SR are equipped with complementing input circuits so arranged that the flip-flop will change state in response to positive pulses applied to the central lead, as will be better understood from the description of FIG. 20. The flip-flops 281, 283 and 285 act together as a counter, to count, for specific reasons, either at least three or at least five IP bit signals. The flip-flops 281, 283 and 285 are shift register-type flip-flops and respond to positive pulses. Hence, the arrival of the first IP bit signal shunted around the "and" gate 257 advances the first counter stage 281 to its "1" side. The counter reads 1–0–0, and according to the binary weighted count 1, 2 and 4, the counter is indicating that it has counted one IP bit signal.

Consider now the circuit operation with the arrival of the second IP bit signal. The second negative bit signal is passed to the inverter 255 where it is inverted into a positive pulse, and is again passed to the "and" gate 257. The arrival of the second positive pulse at the "and" gate 257 causes a negative output from this "and" gate which attempts to transfer the flip-flop 261 to its "1" side. However, the flip-flop 261 is already in its "1" state and therefore there is no change. Likewise, the positive second bit pulse which conditions the "and" gate 267 to conduct, has no effect on the flip-flop 271, since the flip-flop 271 is already in its "1" state. However, the positive second pulse, which is shunted via the line 279 to the flip-flop 281, transfers the flip-flop 281 to its "0" side, which, simultaneously transfers the flip-flop 283 to its "1" side. The counter 286 now reads 0–1–0, indicating that two IP bit signals have been counted. The flip-flops of counter 286 are shift register flip-flops connected similarly to first stage connections shown in FIG. 20.

Consider now the arrival of the third IP bit signal. The third IP bit signal which is negative, as stated before, is inverted into a positive pulse at the inverter 255, and is again passed to partially condition "and" gate 257 to cause an output therefrom. The output from the "and" gate 257 has no effect on the flip-flop 261, as was the case with the second IP bit signal. In short, the effect of the third positive signal occurs when it is shunted around the inverter along the line 279 to transfer the flip-flop 281 to its "1" side so that the counter 286 reads 1–1–0, or indicates that three IP bit signals have been counted. When the counter 286 reads 1–1–0, the output from the respective "1" sides of the flip-flops 281 and 283 condition the "and" gate 298 to produce a negative output which transfers the flip-flop 291 to its "1" side.

The transfer of the flip-flop 291 to its "1" side will result in a negative voltage condition being transmitted along the line 292 from the "0" side of the flip-flop 291 to the "or" gate 293 which in response transmits a positive pulse to the inverter 295. The negative output from the inverter 295 will transfer the flip-flop 261 to its "0" side. With the flip-flop 261 being transferred to its "0" side, the possibility of the feature discriminator providing an output indicating a short bar as a result of the first bit signal has been eliminated since each of the "and" gates 273, 297 and 299 no longer have their leads, which are tied to the "1" side of flip-flop 261, conditioned to provide a positive output signal, (i.e., these gates are disabled).

The remaining IP bit signals, the fourth through the seventh IP bit signals, are now received. After the fifth IP bit signal is counted by counter 286, the flip-flop 305 is transferred to its "1" side. In response to the last-mentioned transfer, the "0" side of the flip-flop 305 transmits a negative voltage back via line 306 to reset the flip-flop 261 to its "0" side and simultaneously reset the flip-flop 291 to its "0" side so that there will be no indication from the feature discriminator that the feature being recognized is a medium bar (three IP bit signals). It should be noted that the flip-flop 291 can be considered as the element which stores the information indicating that the feature is a "medium stroke," and that the flip-flop 305 can be considered the element which stores the information that the feature is a "long stroke." The negative output from the flip-flop 305 through the emitter-follower 308 via the line 310 inhibits the "and" gate 257 so that after the counter 286 counts five IP bit signals, thereby establishing that a long stroke has been read, no more pulses will pass through the "and" gate 257 during the scan of the character.

If information signals on the RC1F line had represented two short bars instead of the long stroke, the following operation would have taken place. The first IP bit signal would have passed through the circuitry as described before, to transfer the flip-flop 261 to its "1" side which would have partially conditioned the "and" gate 307. During a blank space between the two short bars, or at the first bit time when no IP bit signal was present on line 251, there would have been a positive voltage signal on the line 309 to partially condition the "and" gate 287 toward producing a negative output signal. With the arrival of a clock pulse via line 311 at this last-mentioned bit time (the bit time with no ink present), the "and" gate 287 would transmit a negative output signal. As will be explained later, switch 313 may be closed for a particular operation but will be assumed to be open in the description of a preferred embodiment of the present invention. If the switch 313 were closed the negative output signal from the gate 287 would have been passed through the "or" gate 315 to the inverter 317 to reset the flip-flops 281, 283 and 285 to their respective "0" sides. More significantly this negative output from the "and" gate 287 would have been passed through the inverter 319 to provide a positive voltage condition to the "and" gate 307. The provision of this positive voltage condition would complete the conditioning of the "and" gate 307 to produce a negative output signal to thereby transfer flip-flop 321 to its "1" side. The flip-flop 321 can be considered as the element which stores information indicating there has been a short bar followed by a blank space. When a subsequent IP bit signal arrives, indicating at least one other short bar or, in general, subsequent inked area, the positive bit signal from the inverter 255 is passed along the line 323, and at a 3 o'clock angle along the line 325 to the "and" gate 327. The "and" gate 327 is thus conditioned to produce a negative output and the flip-flop 329 is transferred to its "1" side. With the transfer of the flip-flop 329 to its "1" side, the emitter-follower 331 is driven and if this condition remains until the end of the transfer of the information to the feature discriminator 249, the terminal F3–1 will be conditioned high thereby indicating that two or more short bars have been read. At the same time that the flip-flop 329 was transferred to its "1" side, the negative output from the "0" side of the flip-flop 329 causes the flip-flop 261 to be transferred to its "0" side by virtue of this negative signal being transmitted through the "or" gate 293 and through the inverter 295 to the "0" side of the flip-flop 261. In response to a transfer of flip-flop 261 to its zero side the "and" gates 273, 297 and 299 are disabled. Simultaneously this last-mentioned negative signal inhibits the "and" gate 257 thereby preventing any more signals from transferring the flip-flop 261 to its "1" side. It can be considered that the flip-flop 329 stores the information that there has been read two or more short bars.

Consider a further operation of the feature discriminator 249. The storage of the information by flip-flop 261 indicating that a "short bar" has been read, has already been described. There will be passed to the system through the "or" gate 337 via the respective lines 333 or 335, a $d_6$- or $d_7$-bit clock signal. The output of the "or" gate 337 is passed to the "and" gate 339, which in turn provides a negative output in response to an IP bit pulse (at the $d_6$ or $d_7$ time), which transfers the flip-flop 341 to its "1" side. The flip-flop 341 can be considered as an element which stores the information "left," just as the flip-flop 271 stored the information "right." The flip-flop 341 when set on the "1" side indicates that the feature was read during $d_6$ or $d_7$ and these $d$-times occur during the "left" portion of the scan. The "and" gate 299 becomes conditioned to conduct in response to a signal from the "1" side of the respective flip-flops 261 and 341. The output from the "and" gate 299 is passed to the inverter 343, the output of which drives the emitter-follower 303 so that if at the end of the information transfer the output line F6–1 is "high" there is an indication that there has been read a "left short bar."

If, on the other hand, a short bar has been read and neither flip-flop 271 nor flip-flop 341 is transferred to its respective "1" side, the "0" sides of each of these last-mentioned flip-flops, in conjunction with the output from the "1" side of the flip-flop 261, condition the "and" gate 297 to provide an output signal. When the "and" gate 297 transmits a negative output there is an indication that the short bar is in the "middle," and this information signal is passed to the inverter 345, the output of which drives the emitter-follower 301 to provide an indication F5–1 at the end of the information transfer.

The switch 313 through which the blank space signals are passed by virtue of the "and" gate 287 is shown in an open position in FIG. 14. When this switch is closed it is requisite that the bit pulses counted by the counter 286 be consecutive. If these bit pulses are not consecutive, that is if there is a blank space, the counter 286 will be reset to 0–0–0 as was described earlier. If a particular operation requires that the signals be counted consecutively the switch 313 will be closed.

On the other hand, as was discussed earlier in connection with the identification of features by selected points to give reliability in the presence of noise, a long stroke is detected by any five (or more) out of seven positions, along a grid row, which are filled in with ink. Therefore, it is not necessary to count consecutive pulses and the switch 313 in the preferred embodiment presently described is normally in an open position. With the switch 313 in an open position it should be understood that there is a possibility that either the flip-flops 291 and 305 might be transferred to their respective "1" sides at the same time that the flip-flop 329 would be so transferred. If the feature discriminator is to provide as an output a single feature identification signal then it is clear that additional decision logic circuits would be necessary so that the system can decide which particular output (as between the outputs from 291 or 305 versus 329) would be acceptable. However, such additional decision logic circuits are not shown with the instant invention since the system presently described is only required to handle the characters 0 through 9. Because the present system handles only a small percentage of its capacity the features chosen for the present system to enable a recognition of the characters are sufficient without the necessity of additional logic circuits to render a decision between the outputs from 291 or 305 versus 329.

It will be recalled that in the examination of FIG. 2 there was a need for the recognition of the negation of certain features. For instance, the negation of the feature F1–1, which would be $\overline{F1-1}$, is taken from the "0" side of the flip-flop 305. In a similar manner the terminals and circuitry are shown in FIG. 14 to obtain the negative features for each of the features F2–1 through F6–1.

Returning now to the consideration of our example, the flip-flop 305 has been transferred to its "1" side in response to the counter 286 counting five IP bit signals, and this condition in turn drives the emitter-follower 347 to provide a feature output signal F1–1. The feature signal F1–1 indicates a long stroke from the #1 channel, or first vertical level, which of course is present for a numeral "6."

In FIG. 13 there are shown feature discriminators 349, 351, 353 and 355. These feature discriminators are identical with the feature discriminator 249, shown in FIG. 14 and just discussed. If it is known, in consideration of the possible characters to be read, that a particular channel or set of channels (after the reference feature has been established) will not encounter the transmission of certain of the features, for instance, two short bars, then the complete feature discriminator shown in FIG. 14 is not necessary. For instance, in reading the characters shown in FIG. 3 it would not be necessary to provide circuitry to handle the features F1 (long stroke), F2 (medium stroke) or F5 (short bar at center) in the second feature discriminator 349 because these features do not exist at the second vertical level. However, in accordance with a simplified explanation, the feature discriminator in the present invention is considered uniform as shown in FIG. 14, and repeated for the other four vertical level positions.

Also shown in FIG. 13 is the special feature discriminator 357. If there are any IP bit signals transmitted on the RC6F channel via the line 359, these bit signals will partially condition the "and" gate 361. If the "and" gate 361 is thus partially conditioned during the $d_3$, $d_4$ and $d_5$ times, the arrival of last-mentioned "*d*" clock signals, through the "or" gate 363, will fully condition the "and" gate 361 into transmitting a negative output signal.

When the "and" gate 361 is fully conditioned its output signal transfers flip-flop 365 to its "1" side. In a manner similar to that described above in regard to other storing flip-flops, flip-flop 365 can be considered as the element which stores the information "Ink in the Center." The output from the flip-flop 365 drives the emitter-follower 367 thereby providing an output FS7–6 which indicates "Ink in the Center" from the sixth channel. On the other hand, if IP bit signals are transmitted over RC7F channel along the line 369 a slightly different operation follows. The IP bit signals from the RC7F channel are inverted at the inverter 371 to cause the counter 373 to advance. It will be noted that if the counter 373 counts five IP bit signals, and therefore reads 1–0–1, the "1" outputs from the flip-flops 375 and 377 will condition the "and" gate 379 to provide a negative output signal. The "and" gate 379, transmitting an output signal, will transfer the flip-flop 381 to its "1" side. The flip-flop 381 being in its "1" state will drive the emitter-follower 383 and thereby provide an output FS8–7 which indicates a special long stroke being recognized on the seventh channel.

Figure 15:
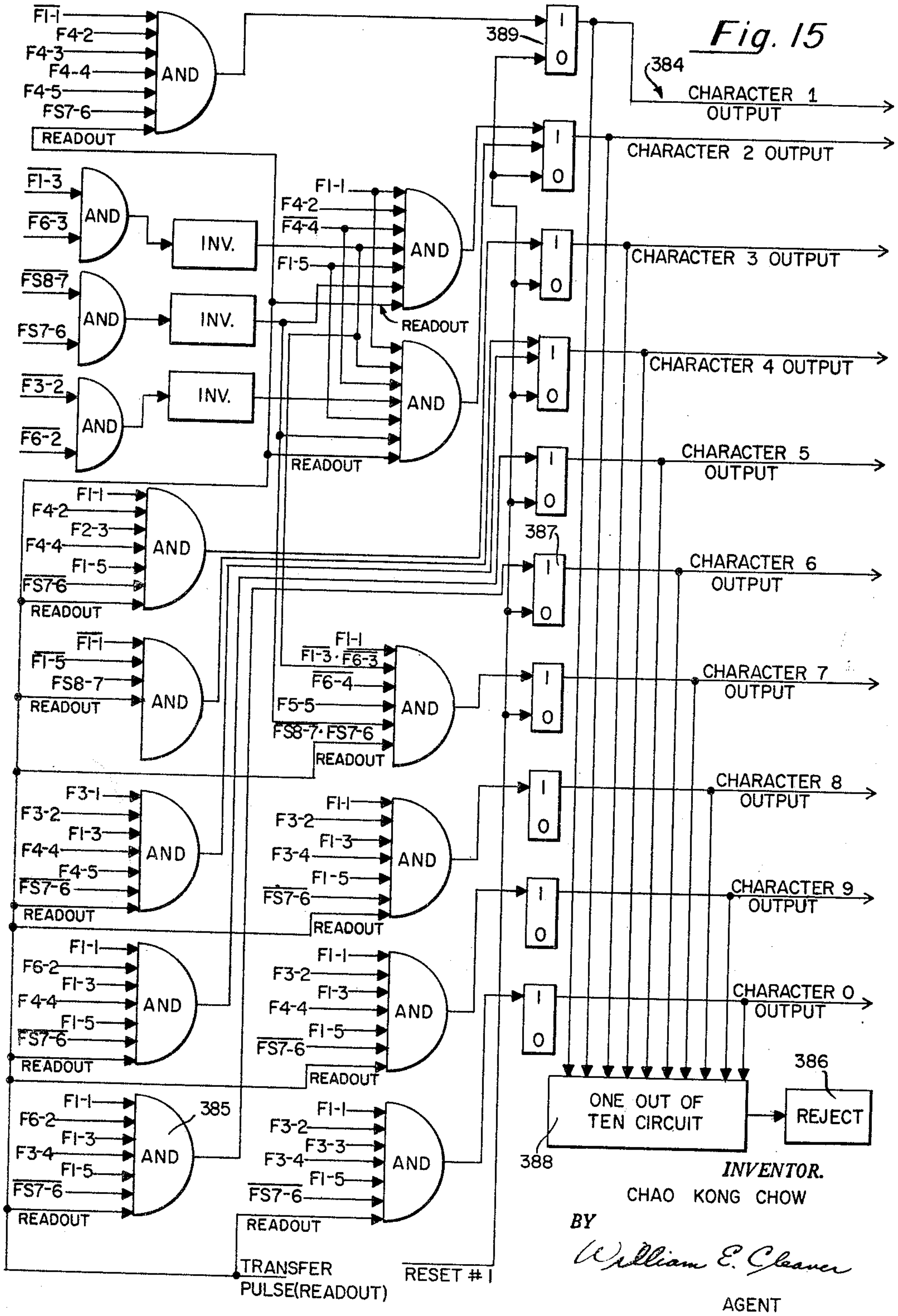

Thus far we have dealt with providing the six regular feature signals on five vertical levels of the character, and two special feature signals. After the feature signals have been obtained they are then passed to the recognition logic as shown in FIG. 15. Certain feature signals have been obtained in keeping with the example of reading the numeral "6." If the IP bit signals produced by the numeral "6" which pass on the lines from the channel reduction circuitry into the feature discriminators are followed through, as was done with the case of the top stroke of the character "6," it will be found that the feature discriminators 249, 349, 351, 353 and 355 will respectively provide outputs F1–1, F6–2, F1–3, F3–4 and F1–5, all of which are transmitted to the "and" gate 385. In effect these feature signals whose identifications and vertical levels are designated by the numbers indicate a long stroke at the top vertical level of the character, a left short bar at the second vertical level, a long stroke at the third vertical level, two short bars at the fourth vertical level, and a long stroke in the fifth vertical level. *In addition* there is tied to the "and" gate 385 a lead from a negative feature FS7–6, which means that there should be no "Ink in the Center." After the feature discriminators of FIGS. 13 and 14 have determined the proper features for the numeral "6," the "and" gate 385 has six of its input leads conditioned for providing an output signal. In response to a transfer pulse which completes the conditioning of "and" gate 385, an output signal is provided. When the "and" gate 385 transmits a negative output signal the flip-flop 387 will be transferred to its "1" side, thus indicating that the numeral "6" has been read. Any particular character can be followed through the circuitry just described in conjunction with the chart of FIG. 2 to show that the assigned flip-flop in the bank 389 will be properly conditioned to represent the characters "0" through "9."

*Unit detail operation*

Earlier in the description of the system operation it was suggested that for purposes of examining the system operation the pulses from the timing circuit should be accepted as being properly generated and timed. Therefore, a consideration of the generation of the timing pulses at this point is warranted. The operation of the timing circuits can be better understood from an examination of FIGS. 17, 18*a* and 18*b*.

In FIGS. 18*a* and 18*b* (placed together as shown in FIG. 18*c*) there is found in the upper left-hand corner the starting point of the initial reset circuit 391. The switch 393 can be considered as normally resting against the terminal 431. The relay 392 in the power supply is a thermal relay which, when it has been heated sufficiently, transfers strap 397 from the terminal 399 to the terminal 400. When the push button 402 is depressed the strap 393 is transferred to the terminal 395 to provide an initial reset signal which passes through the ten microsecond delay element 401 and the emitter-follower 403 to the initial reset terminal 405.

As is shown in FIGS. 18*a* and 18*b*, the initial reset pulse is provided at the terminal 405 and this reset pulse is used throughout the system. The initial reset pulse is primarily used to reset all flip-flops in the system before the machine gets into operation. Within the timing circuit, the initial reset pulse is passed along the line 407 to reset the flip-flop 409 and to simultaneously set the flip-flop 411. The flip-flop 411 is set to its "1" side. The initial reset pulse is also passed along the line 415 through the mixer 417, inverter 419 and emitter-follower 421 to the output terminal 413, which is designated reset (pulse) #1. Simultaneously, the reset (pulse) #2 output terminal 423 also provides a reset signal, since the initial reset pulse is transmitted through the mixer 425, the inverter 427 and the emitter-follower 429. The system, after having had its flip-flops throughout initially reset to their respective "0" sides, is considered ready for operation.

Figure 9:
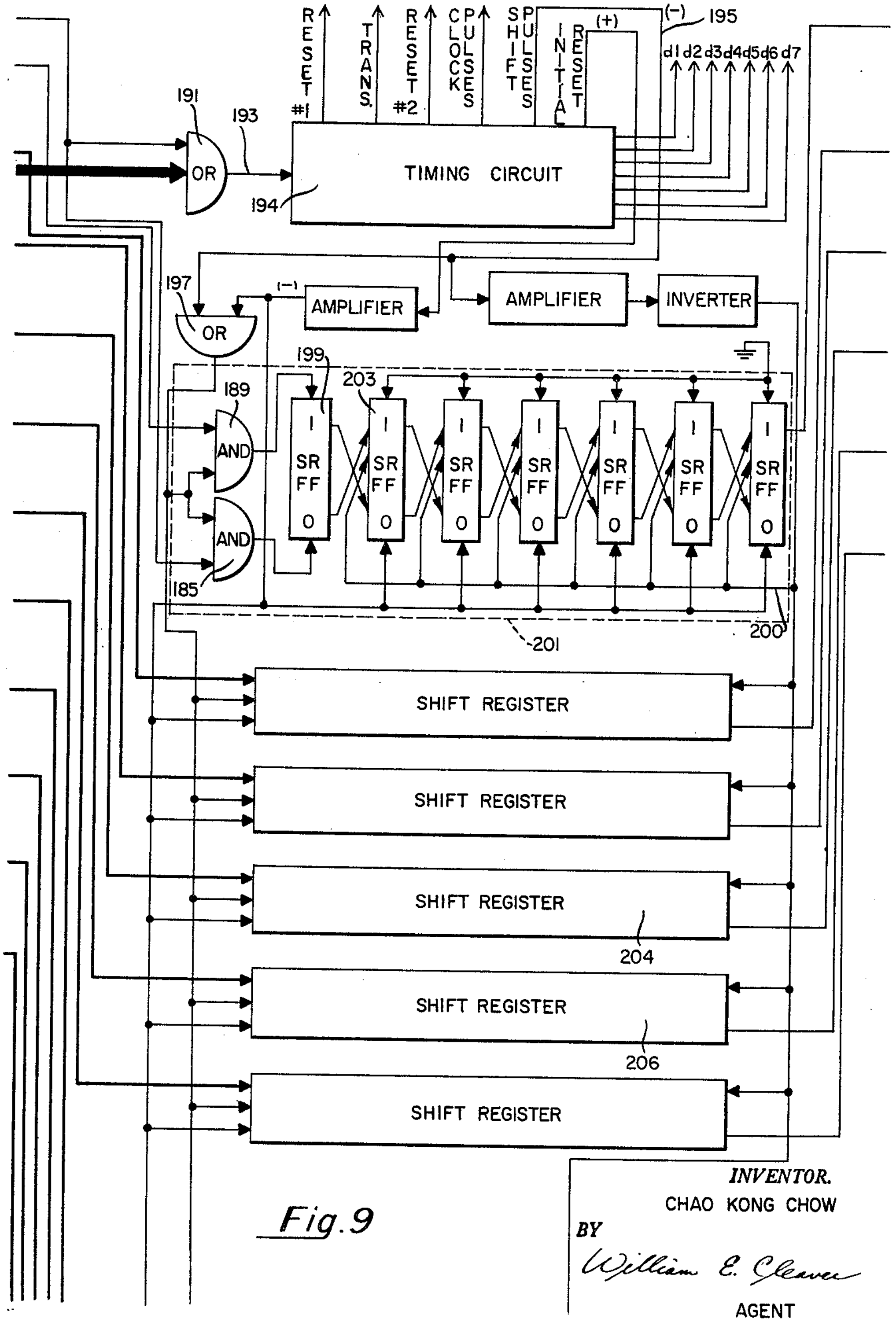

As was suggested earlier in the description of the "or" gate 191 of FIG. 9, the first digitized pulse starts the operation of the clock circuit. When the first digitized signal comes from the digitizer, it is applied on the channel 433 through the ten microsecond delay device 435 and through the "or" gate 437 to the "and" gate 439. The "and" gate 439 is normally partially conditioned to conduct unless it is inhibited by a negative signal on the line 441. Since initially there is no inhibition of the gate 439, the signal initiated by the first digitized signal read is passed through the gate 439 to the ten microsecond delay device 443 and subsequently therethrough to transfer the flip-flop 409 to its "1" side.

With the flip-flop 409 in its "1" state, there is transmitted to the gated pulse generator 445 a positive voltage condition. As long as this positive voltage condition is applied to the gated pulse generator 445, this generator runs as a free-running multivibrator. A typical free-running multivibrator which can be used for the device 445 will be explained hereinafter in connection with FIG. 19. When the gated pulse generator starts in operation, the first positive clock pulse therefrom will partially condition each of the "and" gates 447, 449, 451, 453, 455, 457 and 459. Simultaneously with the first positive clock pulse, there will be produced a negative clock pulse transmitted via the line 461 which will pass through the eight microsecond delay device 463 and through the inverter 464 to advance the counter 465. The counter 465 will be advanced with each of the inverted negative clock pulses according to a typical counter advancing operation, wherein the counter stages are made of flip-flops. In FIG. 18*a* the odd-numbered "and" gates 447 through 459 show three input leads grounded. In the actual system the "and" gates used in the clock circuit had seven input leads and since three of these leads were not being used they were tied to ground.

Initially the counter 465 is reading 0–0–0, and the "and" gate 447 is partially conditioned from the respective "0" sides of the flip-flops 467, 469 and 471. The positive clock pulse from the gated generator 445, which is passed along the line 473, is transmitted to the gate 447 to fully condition this gate and provide an output therefrom. In other words, there is a pulse through the gate 447 in response to the first positive clock pulse from the pulse generator 445. After the first positive clock pulse initiates the $d_1$ pulse, the negative clock pulse through the eight microsecond delay 463 and through the inverter 464 transfers the flip-flop 467 to its "1" side, which simultaneously inhibits the gate 447 and terminates the $d_1$ pulse. The eight microsecond delay coincides with the duration (8 $\mu$sec.) of the pulse from the free running multivibrator.

After the first clock pulse the counter 465 reads 1–0–0, which partially conditions the "and" gate 449. The second positive clock pulse is passed through the "and" gate 449 and provides the start of the $d_2$ signal. The second negative clock pulse transmitted on the line 461 through the eight microsecond delay device 463 and the inverter 464 will cause the counter 465 to read 0–1–0, and this will inhibit the gate 449 terminating the $d_2$ pulse. A continuation of this operation will provide seven digit pulses, $d_1$ through $d_7$, respectively obtainable at the (odd numbered) terminals 473 through 485.

The seventh "*d*" pulse, $d_7$, is also passed via the line 487 to the ten microsecond delay device 489. After the ten microsecond delay at the delay device 489, this $d_7$ pulse is passed (upward) to the emitter-follower 491. The $d_7$ pulse from the emitter-follower 491 resets the flip-flops 467, 469 and 471 by being transmitted along the line 493, and thus return the counter 465 to zero-count state. Simultaneously the delayed $d_7$ pulse from the emitter follower 491 is transmitted along the line 495 to reset the flip-flop 409 to its "O" side which terminates the action of the multivibrator 445. In another simultaneous application, the delayed $d_7$ pulse transfers the monostable flip-flop 497 to its unstable side for 100 microseconds. This provides a negative voltage condition on line 441 to inhibit the "and" gate 439 for 100 microseconds. The $d_7$ pulse, after being delayed ten microseconds at the delay device 489, is delayed another ten microseconds at the delay device 499 to provide a reset pulse #1 on line 501. this being twenty microseconds after the initiation of the $d_7$ pulse. Reset pulse #1 is transmitted through the mixer 417, inverter 419 and emitter-follower 421 to terminal 413. The $d_7$ pulse is delayed another twenty microseconds through the two ten microsecond delay devices 503 and 505 to provide the transfer pulse on the line 507. The transfer pulse on 507 is passed through the inverter 509 and through the emitter-follower 511 to the terminal 513, to be used throughout the system wherever warranted. The $d_7$ pulse is delayed another twenty microseconds through the two ten microsecond delay devices 514 and 517, to provide on the line 519 the reset pulse #2 which will occur twenty microseconds after the transfer pulse.

After the $d_7$ pulse has been delayed for sixty microseconds through the respective delay devices 489, 499, 503, 505, 515 and 517, it is delayed for another sixty-five microseconds by the signal delay line 520. Thereafter, the delayed pulse is transmited through the inverter 521 and passed to the "and" gate 523. It will be recalled that the flip-flop 411 was transferred to the "1" side with the original, initial reset pulse. With the flip-flop 411 sitting on its "1" side, the "and" gate 523, prior to the receipt of the delayed $d_7$ pulse, has one of its input leads properly conditioned toward providing a negative input. It should be remembered at this point that the operation of the reset pulses occur in response to a $d_7$ pulse which means that the character has been scanned and another character will soon pass through the read station. The monostable multivibrator 525 will provide a positive voltage condition on the line 527 for as long a time as the monostable multivibrator is not transferred to its unstable side.

It should be pointed out that the recycling circuit design herein described operates with a system using the ABA document specification. This is to say, the distance between the leading edges of adjacent characters is fixed. Therefore, $d_1$ pulses should occur at regular intervals. If a different document specification is used, for instance, a system where the distance between the leading edges of the adjacent characters is not fixed, then the recycling circuitry would have to incorporate slightly different features. For example, the signal delay device 520 would in all probability delay the signal for the maximum amount of time between the leading edges of the system.

When a $d_1$ pulse from a subsequent scanned character is transmitted on the line 529 to the monostable multivibrator 525, the multivibrator is transferred to its unstable side and for twenty microseconds provides a negative, or inhibiting, voltage condition to the "and" gate 523. The negative voltage condition for the twenty microseconds just described will begin before and will extend beyond the time of the output pulse from the multivibrator 520. This condition becomes clear with an examination of FIG. 17. Therefore, there will be no signal transmitted from the "and" gate 523 in response to an output from the multivibrator 520 if there is a subsequent character being read which supplies a $d_1$ pulse. On the other hand, if the $d_7$ pulse, which was delayed for the 125 microseconds, as described before, was a $d_7$ pulse from the last character being read, there would be no subsequent $d_1$ pulse from a subsequent character and therefore the gate 523 would be conditioned to transmit a signal in response to an output signal from the multivibrator 520. The signal from the gate 523, transmitted on the line 531, will set the flip-flop 409 to its "1" side to provide another set of seven clock pulses. Simultaneously, the signal from the gate 521 will set the flip-flop 411 to its "0" side so that at the end of the last seven clock pulses the gate 523 will be inhibited and the clock generator will not continue to run. This last-mentioned operation is necessary to provide an additional seven clock pulses after the last character has been read, in order to transfer the information from the shift register into the other portions of the character recognition system so that it may be processed as described earlier. The graphs in FIG. 17, which represent the timing arrangement of pulses provided by the circuitry of FIGS. 18*a* and 18*b* are self-evident and can be easily understood in connection with the previous description of *FIGS.* 18*a* and 18*b*. The delay lines have been given certain time delays in the circuit shown in FIGS. 18*a* and 18*b*. These time delays were chosen to fit the system demands of reading 2400 characters to 3200 characters per second. Obviously if the system were to read at another character rate other time delays would be used.

In FIG. 19 there is shown a typical multivibrator device which can be used for the gated pulse generator 445. It is to be understood that other free-running multivibrator circuits can be used. The positive potential applied (from flip-flop 409 in FIG. 18*a*) to the input terminal 533 will render the diode 535 nonconducting, which will in turn cause the point 537 to become relatively positive. As the point 537 goes relatively positive, the PNP transistor 539 tends toward nonconduction, and the NPN transistor 541 tends toward conduction. With the PNP transistor 539 tending toward nonconduction, and the transistor 541 conducting, the junction point 543 becomes relatively positive which causes the voltage appearing at the output terminal 545 to have a positive voltage shift providing the initiation, or leading edge, of a positive pulse. Simultaneously, the relatively positive voltage appearing at 543 will tend to charge the condensor 547 which will tend to render the PNP transistor 549 nonconducting. As the PNP transistor 549 tends toward nonconduction, the junction point 551 becomes relatively negative, which in turn causes the PNP transistor 553 to tend toward conduction and the NPN transistor 555 toward nonconduction. With the PNP transistor 553 tending toward conduction the junction point 557 becomes relatively negative, providing a negative voltage shift or the start of a negative pulse at the output terminal 559. The negative potential at 557 will discharge the condensor 561 causing the PNP transistor 563 to tend toward conduction. With the PNP transistor 563 conducting, the junction point 565 becomes relatively positive. With the voltage condition at 565 being relatively positive, the diode 567 is biased into nonconduction and the point 537 becomes more positive to continue the voltage shifts at each of the outputs 545 and 559, as previously described. However, when the condensor 547 is fully charged the junction point 569 again approaches the negative supply value and the PNP transistor 549 tends to conduct, which in turn drives the point 551 relatively positive, causing the PNP transistor 553 to tend toward nonconduction, and the NPN transistor 555 to tend toward conduction. This operation, of course, causes the point 557 to become relatively positive and the voltage shift at the output terminal 559 is in a positive direction, completing the lagging edge of the negative pulse. Simultaneously, with the junction point 557 becoming positive, the condensor 561 tends to be charged causing the PNP transistor 563 to go toward nonconduction. With the PNP transistor 563 tending toward nonconduction, the junction point 565 tends toward a relatively negative potential, thereby forward biasing the diode 567 into conduction. This in turn causes the junction point 537 to become relatively negative, which in turn causes the PNP transistor 539 to conduct and the NPN transistor 541 to not conduct. This last mentioned transistor operation, of course, causes the junction point 543 to become relatively negative, providing the lagging edge of the positive pulse at terminal 545. It becomes evident that so long as there is a positive potential applied to the terminal 533, the device shown in FIG. 19 will run as a free-running multivibrator providing two sets of clock pulses, positive and negative, at respective terminals 545 and 559. The period of oscillation in the multivibrator of FIG. 19 depends upon the R-C time constant of the resistor 568 with the capacitor 547, as well as the resistor 571 with the capacitor 561.

In FIG. 20 there is shown a typical flip-flop circuit which is used in the preferred embodiment in the shift register described in connection with FIG. 7 and at other points in the system as a counter stage. The dashed lines 592 and 594 show the connection for this flip-flop when it is used as the first stage, of a shift register, or in counter stages or by itself. The dashed lines 596 and the clamp 598 are used in the counter stages after the first stage, to improve the response. The reset pulse, which is applied to the terminal 590, causes the PNP transistor 591 to conduct, providing a ground potential at the output collector terminals 593, which simultaneously causes the transistor 595 to become nonconducting. With the voltage supplies as shown in FIG. 20, there will be approximately ground potential at the "0" output terminal 593, and approximately −7 volts at the "1" output terminal 597. These terminals are connected to the preceding stage according to the legends at the input terminals 599 and 601. Assume that the preceding stage had a "1" therein (or the flip-flop was reset to have transistor 591 conducting and the leads 592 and 594 were connected), then there would be a ground potential at 599, and a −7 volt potential at the terminal 601. The potential on line 611 when there is no positive pulse supplied is arranged to be approximately −6 volts. Such an arrangement is evident in FIGS. 14 and 12. The input lead to flip-flop 281 comes from the inverter 255. The input to inverter 255 comes from the "and" gate 250. When the "and" gate 250 is not conditioned by coincidence of signals at its inputs, the gate is providing a positive voltage output. This positive voltage signal is inverted at inverter 255 to provide the −6 v. condition on the "shift" terminal of flip-flop 281. Consequently, there is a −1 volt potential difference across the capacitors 605 and a −6 volt potential across the capacitor 607. The negative shift pulses from the clock circuit are normally inverted and transmitted as positive pulses to terminal 609. A positive signal is then received on lead 611. The positive potential appearing across the capacitor 607 when measured from this positive signal on line 611 causes the transistor 591 to become nonconducting and this in turn causes the transistor 595 to become conducting. As was suggested earlier the flip-flops designated SR are of the type described in connection with FIG. 20. The other flip-flops can be any well known types which respond to negative pulses for transferral. In FIG. 12 there is a reject circuit 176 connected to the C (control) output lines from the vertical registration circuit shown in FIG. 8. The reject circuit 176 is connected to the C lines through a switching circuit 178 entitled "One Out of Eleven Circuit." Similarly, there is shown in FIG. 15 a reject circuit 386 connected to the character recognition output lines through a switching circuit 388 which is entitled "One Out of Ten Circuit." Switching circuits of the type "One Out of X," such as circuits 178 and 388, are well known and suitable circuitry can be found in the text "The Design of Switching Circuits," by Keister, Ritchie and Washburn, published by Van Nostrand, 1951. These circuits provide an output if there is more than one signal present on the lines to which they are connected or if there is less than one signal on these last-mentioned lines. In other words, if there were no output signals on the character output terminals 384 or if there was more than one signal thereon, then, a reject signal would be transmitted from the circuit 388 to the reject circuit 386. The reject circuit may provide a warning light, select a chute blade, etc., depending upon the use of the character recognition system. Reject circuits obviously can be set up at other points in the system if it is deemed to be useful. In the preferred embodiment, switching circuits 388 and 178 are diode matrices which follow the logic equation:

$$\text{No reject}=(C_1\cdot\overline{C}_2\cdot\overline{C}_3\cdot\overline{C}_4\cdot\overline{C}_5\cdot\overline{C}_6\cdot\overline{C}_7\cdot\overline{C}_8\cdot\overline{C}_9\cdot\overline{C}_0) +(\overline{C}_1\cdot C_2\cdot\overline{C}_3\cdot\overline{C}_4\cdot\overline{C}_5\cdot\overline{C}_6\cdot\overline{C}_7\cdot\overline{C}_8\cdot\overline{C}_9\cdot\overline{C}_0) +----+(\overline{C}_1.\overline{C}_2.\overline{C}_3.\overline{C}_4.\overline{C}_5.\overline{C}_6.\overline{C}_7.\overline{C}_8.\overline{C}_9.C_0)$$

While I have described above the principles of my invention in connection with specific apparatus, it is to be clearly understood that this description is made only by way of example and not as a limitation to the scope of my invention as set forth in the objects thereof and in the accompanying claims.

I claim:

1. A character recognition system for recognizing a character printed with magnetizable ink comprising a magnetic record transducer having X number of magnetic read heads each capable of translating character features into feature signals, said read heads disposed so that Y number of adjacent heads, where Y is less than X, will represent one more head than is required to insure a complete scan of said character, registration means including Y number of channels each having an associated "or" gate, each "or" gate being coupled to an associated set of said read heads where each set is identified as an N set and each head of said N set is identified as the $(N+(A)(Y))^{th}$ head, wherein N assumes each value of 1 through Y and when N is fixed A can be any integer including zero within the tens value of X, a plurality of digitizing means each coupled to an associated one of said channels to receive said feature signals and respectively translate each feature signal into a digitized feature signal, a plurality of shift register means with one each coupled to an associated one of said digitizing means, timing-pulse generating means coupled to said plurality of said shift register means to advance said feature signals into said associated shift register means in quantized form, signal reference means coupled to said digitizing means to sample said digitized feature signals and designate one digitized feature signal as a reference feature signal to represent a reference feature of said character, coincident circuitry means having Y channel input means and Y–1 feature signal output means coupled to said shift register means and said signal reference means to align the other digitized feature signals with respect to said digitized reference signal, feature reduction circuitry means coupled to said coincident circuitry output means to reduce said Y–1 feature signals to Z reliable useful feature signals where Z is less than Y–1, and logic circuitry coupled to said feature reduction circuitry to provide a particular signal identifying the character being read in response to the aligned digitized feature signals received therefrom.

2. A character recognition system according to claim 1 wherein said timing pulse generating means is coupled to said plurality of digitizing means to initiate the generation of timing pulses in response to the first digitized signal received thereat.

3. A character recognition system according to claim 1 wherein said signal reference means includes means to detect the channel which is reading ink which lies adjacent a channel which is not reading ink and in response thereto designate the feature signal on said ink-reading channel as the reference feature signal.

4. A character recognition system according to claim 1 wherein there is further included means for detecting when more or less than one reference feature signal has been designated to provide a reject signal in response to this detected condition.

5. A character recognition system comprising a scanning means for scanning a character and providing a set of feature signals with each signal respectively representing a feature of said character, timing-pulse generating means to supply timing pulses to said system, a plurality of signal digitizing means each providing an associated signal channel coupled to said scanning means to translate said feature signals into digitized feature signals, registration means coupled to said signal channels to sample the information thereon and detect a channel which is reading a feature and which is lying adjacent to a channel which is not reading a feature, said registration means further providing a selection of the feature signal on this last-mentioned feature reading channel as a reference feature signal, a plurality of shift register means each assigned to an associated one of said channels and coupled to said digitizing means to receive and store said digitized feature signals in the form of series bit signals, coincident circuitry coupled to said shift register means and coupled to receive said reference feature signal to enable said reference feature signal to condition said coincident circuitry to operate on said stored feature signals so as to align said digitized feature signal with respect to said reference digitized feature signal, a plurality of feature determining means with each coupled to receive an associated feature signal in the form of series bit signals, each of said feature determining means including counting means to count said series bit signals to determine the width of an associated feature, each of said feature determining means further including coincidence means coupled to said counting means and connected to said timing pulse generating means to provide coincidence between a selected count and a selected system time to determine the position of an associated feature, a plurality of second storing means each coupled to an associated one of said last-mentioned coincidence means to store, in response to a coincidence signal therefrom, an indicative feature signal, and indicative signal combining means coupled to said last-mentioned storing means to combine and match said indicative feature signals to provide a recognition of a character read by the unique combination of said combined indicative feature signals.

6. A character recognition system comprising a plurality of character scanning means to simultaneously provide a plurality of scanning signals, a scanning signal registration means commonly coupled to said plurality of scanning means to simultaneously register a segment of said plurality of scanning signals, a plurality of signal storage means connected to said scanning means to receive and store the signals of a scanned segment of said character, a character orientation means commonly connected to said plurality of signal storage means to simultaneously receive and position said plurality of scanned signals into one of a plurality of predetermined character feature orientations, a plurality of character feature discriminating means commonly connected to said character orientation means to identify the scanned character corresponding to one of said predetermined feature oriented signals by logical selective discrimination.

7. A character recognition system as set forth in claim 6 wherein said scanning signal registration means includes a plurality of flip-flop circuits, each having a set and a reset input terminal, said set input terminals of each flip-flop individually connected to selected ones of said plurality of scanning means and said reset terminals individually connected to other selected ones of said plurality of scanning means whereby the operative condition of one of said flip-flop circuits denotes the location of an inactivated scanning means among said plurality of scanning means.

8. The character recognition system as set forth in claim 6 wherein said plurality of character scanning means include multiple magnetic heads positioned to simultaneously scan contiguous horizontal segments of a character located on said document.

9. A character recognition system as set forth in claim 6 wherein said plurality of scanning means includes a plurality of scanning signal, amplifying, digitizing means connected to a plurality of scanning signal, sensing means, said plurality of sensing means equal to at least twice said plurality of amplifying digitizing means.

10. A character recognition system as set forth in claim 6 wherein said plurality of amplifying digitizing means is equal to said plurality of flip-flop circuits included in the registration means of said recognition system.

11. A character recognition system as set forth in claim 6 wherein said plurality of sensing means are positioned to simultaneously sense the character to be recognized in horizontal segments, said sensing being accomplished by a portion of said plurality of character sensing means to provide a plurality of horizontal scanning signals equal to said segments, to an equal plurality of said amplifying digitizing means.

12. A character recognition system, as set forth in claim 11 wherein a timing circuit is connected between said plurality of amplifying digitizers and said plurality of storage means to provide said plurality of storage means with a cyclic series of sensing signal samples upon activation by said digitizers.

13. A character recognition system as set forth in claim 12 wherein said timing circuit, coupled to said storage means to provide for transfer of digitized information thereto, simultaneously provides, for the transfer therefrom of information presently therein, to said character orientation means, said timing circuit also being coupled to said character registration means to simultaneously provide for the transfer of information therefrom likewise to said orientation means whereby said character orientation means is coincidentally energized by horizontal information from said scanning channels and vertical information from said registration means to thereby provide a properly oriented version of said scanned and registered character.

14. A character recognition system comprising a plurality of character scanning means to simultaneously provide a plurality of scanning signals, a plurality of amplifying binary digitizers selectively connected to said plurality of scanning means, each of said digitizers to amplify and digitize a single scanning signal, a scanning signal sampling means commonly coupled to said plurality of amplifing digitizers to simultaneously sample said plurality of amplified digitized scanning signals, a plurality of sampled signal storage means connected to said sampling means and said digitizers to receive and store the sample binary signals of the scanned segment of said character, a character orientation means commonly connected to said plurality of sampled signal storage means to simultaneously receive and position said plurality of sample binary signals into one of a plurality of predetermined character feature orientations, a plurality of feature discriminating means commonly connected to said character orientation means to identify the scanned character corresponding to one of said predetermined feature oriented signals by a process of logical selective discrimination.

15. The character recognition system as set forth in claim 14 wherein said character orientation means includes a plurality of gating circuits interconnected as an $x$–$y$ matrix having $x$ rows and $y$ columns where $y=x-1$ and $x$ corresponds in plurality to said plurality of storage means.

16. A character recognition system comprising a plurality of character scanning means to simultaneously provide a plurality of scanning signals, a plurality of amplifying binary digitizers connected to said plurality of scanning means to amplify and digitize each of said scanning signals, a scanning signal sampling means commonly connected to said plurality of amplifying digitizers to simultaneously sample said plurality of amplified digitized scanning signals, a plurality of sampled signal storage means connected to said sampling means and said digitizers to receive and store the sampled binary signals of the scanned segment of said character, a cyclic switching matrix commonly connected to said plurality of sampled signal storage means to simultaneously receive and position said plurality of sampled binary signals into one of a plurality of predetermined character feature orientations, a plurality of character feature discriminating means commonly connected to said cyclic switching matrix to identify said feature oriented signals within said cyclic switching matrix by selective discrimination.

17. A character recognition system as set forth in claim 16 wherein said sampled signal storage means include a plurality of shift registers having binary positions equal in number to the vertical sampling segments performed on each character by said sampling means.

18. The character recognition system as set forth in claim 17 wherein said plurality of amplifying and digitizing means are activated by a gating means whereby the plurality of said amplifying and digitizing means is reduced below said plurality of said character scanning means.

19. The character recognition system as set forth in claim 18 wherein said cyclic switching matrix is comprised of a plurality of AND gates, said matrix having a plurality of rows equal in number to said plurality of shift registers and said matrix further having a plurality of columns determined by said plurality of predetermined feature signals.

20. The character recognition system as set forth in claim 19 wherein said sampling means is activated through a plurality of seven vertical timing segments which activation is initiated by the presence of a character being sensed by any of said plurality of character scanning means.

21. The character recognition system of claim 20 wherein said plurality of character scanning means is much greater than said plurality of character scanned segments, only those of said plurality of scanning means being utilized which are activated by the presence of a character horizontally moving across the face of said scanning means to thereby enable a wide variation in the positioning of said character within the vertical area covered by said plurality of character scanning means.

22. A multiple scan magnetic character recognition system comprising an alternating current character magnetizing means, a plurality of magnetic sensing scanning means positioned to sense magnetized segments of a magnetized character, a plurality of OR gating means coupled to said sensing scanning means, a plurality of amplifying and digitizing means each correspondingly connected to respective individual gates of said plurality of OR gating means, a time sampling means commonly connected to all of said plurality of amplifying and digitizing means to simultaneously sample the digitized scanning signals, a plurality of shift registers, each of which is coupled to one of said digitizing means to receive and temporarily store successive sampled segments of the digitized signal, a cyclic switching matrix, each row of which is coupled to one of said plurality of shift registers, a vertical registration means connected between the scanning digitizers and the columns of said cyclic switching matrix to cyclically switch the crosspoints of said matrix to enable the contents of said shift registers to be gated therethrough, a plurality of character feature discriminating means correspondingly connected to the respective columnar outputs of said cyclic matrix to receive the cyclically switched output and identify said scanned character by logically selective discrimination.

(References on following page)

References Cited by the Examiner

UNITED STATES PATENTS

| | | | |
|---|---|---|---|
| 2,616,983 | 11/52 | Zworykin | 340—149.1 |
| 2,838,602 | 6/58 | Sprick | 340—149.1 |
| 2,889,535 | 6/59 | Rochester | 340—149.1 |
| 2,898,576 | 8/59 | Bozeman | 340—149.1 |
| 2,905,927 | 9/59 | Reed | 340—149.1 |
| 2,918,653 | 12/59 | Relis | 340—149.1 |
| 2,932,006 | 4/60 | Glauberman | 340—149.1 |
| 2,933,559 | 4/60 | Campbell | 340—149.1 X |

FOREIGN PATENTS 1,146,002 11/57 France.

OTHER REFERENCES

Pages 1744 to 1750, October 1958, "A Computer Oriented Toward Spatial Problem," by Unger, "Proceedings of IRE."

MALCOLM A. MORRISON, *Primary Examiner.*

E. R. REYNOLDS, IRVING L. SRAGOW, *Examiners.*